(12) United States Patent
Fujieda

(10) Patent No.: US 7,155,504 B1
(45) Date of Patent: Dec. 26, 2006

(54) DATA DELIVERY SYSTEM AND SENDING STATION THEREFOR

(75) Inventor: Makoto Fujieda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/562,966

(22) Filed: May 3, 2000

(30) Foreign Application Priority Data

Jun. 18, 1999 (JP) ................................. 11-171859

(51) Int. Cl.
G06F 15/173 (2006.01)

(52) U.S. Cl. .................... 709/224; 709/219; 707/10; 707/104.1

(58) Field of Classification Search ................ 709/217, 709/203, 219; 707/10, 104.1
See application file for complete search history.

(56) References Cited

U.S. PATENT DOCUMENTS

| | | | | |
|---|---|---|---|---|
| 4,754,428 A | * | 6/1988 | Schultz et al. | 709/246 |
| 4,961,148 A | * | 10/1990 | Holda et al. | 700/97 |
| 5,089,970 A | * | 2/1992 | Lee et al. | 700/96 |
| 5,406,557 A | * | 4/1995 | Baudoin | 370/407 |
| 5,732,200 A | * | 3/1998 | Becker et al. | 358/1.15 |
| 5,777,877 A | * | 7/1998 | Beppu et al. | 700/97 |
| 5,790,790 A | * | 8/1998 | Smith et al. | 709/206 |
| 5,870,089 A | * | 2/1999 | Fabbio et al. | 345/733 |
| 6,192,407 B1 | * | 2/2001 | Smith et al. | 709/229 |
| 6,317,838 B1 | * | 11/2001 | Baize | 713/201 |
| 6,442,696 B1 | * | 8/2002 | Wray et al. | 713/201 |
| 6,505,195 B1 | * | 1/2003 | Ikeda et al. | 707/3 |
| 6,529,956 B1 | * | 3/2003 | Smith et al. | 709/229 |
| 6,591,247 B1 | * | 7/2003 | Stern | 705/14 |
| 2003/0115450 A1 | * | 6/2003 | Smith | 713/153 |

FOREIGN PATENT DOCUMENTS

| | | | |
|---|---|---|---|
| GB | 2341703 | * | 3/2000 |
| GB | 2 348 025 | | 9/2000 |

(Continued)

OTHER PUBLICATIONS

Faux, Ivor et al., Intelligent access, publishing and collaboration in global engineering networking, Computer Networks and ISDN Systems 30 (1998), pp. 1249-1262.*

(Continued)

*Primary Examiner*—Ario Etienne
*Assistant Examiner*—LaShonda Jacobs
(74) *Attorney, Agent, or Firm*—Staas & Halsey LLP

(57) ABSTRACT

A data delivery system which delivers created data to all the parties that need it. Documents such as engineering drawings are stored as bulk data files in a bulk data database. Metadata files containing attribute information of bulk data are stored in a metadata database. When the date and time of a data distribution session is given to a date/time setting unit, an attribute identification unit makes access to a relevant metadata file to identify the attributes of the bulk data to be transmitted. Based on this result, a destination determination unit determines the destinations of each bulk data file. A format identification unit then identifies which data formats the receiving stations can handle. If necessary, the data format is changed by a format converter, so as to meet the requirements of each destination. Summary data briefly describes what kinds of bulk data files are to be distributed. A summary data transmitter compiles such summary data and sends it to the receiving stations. Each receiving station now returns a downloading request, and in response to this, a transmitter sends out the requested bulk data files, which meets the destination's format guideline. A receiver in the receiving station accepts those bulk data files and a reproduction unit restores the received data to its original form.

9 Claims, 22 Drawing Sheets

FOREIGN PATENT DOCUMENTS

| | | | |
|---|---|---|---|
| GB | 2348025 | * | 9/2000 |
| JP | 58-130650 | * | 8/1983 |
| JP | 05-308379 | * | 11/1993 |
| JP | 07-200208 | * | 8/1995 |
| JP | 08-314863 | * | 11/1996 |
| JP | 09-008840 | * | 1/1997 |
| JP | 10-301903 | * | 11/1998 |
| JP | 11-143051 | * | 5/1999 |
| WO | WO 97/39406 | * | 10/1997 |
| WO | WO 98/02824 | * | 1/1998 |
| WO | WO 98/35326 | * | 8/1998 |

OTHER PUBLICATIONS

Peltonen, Hannu et al., Process-based view of product data management, Computers in Industry, (1996) pp. 195-203.*

Hilal, Wael Bahan-El-Din, et al., Designing Large Electronic Mail Systems, IEE (1988), pp. 402-409.*

Hilal, Wael Bahan-El-Din, et al., Designing Large Electronic Mail Systems, IEEE (1988), pp. 402-409.

* cited by examiner

| 60 | DISTRIBUTION TABLE LIST | | | | □ × |
|---|---|---|---|---|---|
| DOCUMENT RELEASE LEVEL | FINAL RELEASE ▽ 60a 60b | | | | |

DISTRIBUTION TABLE LIST (60c)

| TITLE | CREATED BY | CREATED ON | LAST UPDATED ON |
|---|---|---|---|
| CAMERA/PRINTER | YAMAGUCHI | | |
| VIDEO | NAKAGAWA | | |
| MUSICAL INSTRUMENT | YAMAGUCHI | | |
| TELECOM (PAGER AND PHS) | SATO | | |
| WATCH | SATO | | |

◁ 60f   ▭ 60e   ▷ 60g

CONTACT INFORMATION (60d)

| DIVISION | NAME | PHONE NUMBER | REMARKS |
|---|---|---|---|
| TOKYO FOURTH ENGINEERING DEPT. | SATO | 03-3333-4444 | |
| PURCHASING DEPT. | FUKAZAWA | 03-2222-3333 | |

◁ 60i   ▭ 60h   ▷ 60j

[NEW] 60k   [MODIFY] 60l   [COPY] 60m   [DELETE] 60n   [CANCEL] 60o

F I G. 3

| DISTRIBUTION LIST EDITOR | | | | | | | |
|---|---|---|---|---|---|---|---|
| DOCUMENT RELEASE LEVEL | FINAL RELEASE ▽ | | | | | | |
| CAMERA/PRINTER | PRO-DUCTION PLANNING SECTION | FOURTH ENGI-NEERING GROUP | QUALITY ENGI-NEERING SECTION | PARTS CENTER | DIVISION MANAGE-MENT DEPT. | MOLD COORDI-NATION SECTION | IN-DUSTRIAL DESIGN DEPT. |
| COMPONENT DRAWINGS | 4 | 1 | | | | | |
| ASSEMBLY DRAWINGS | 1 | 3 | 7 | | | 5 | |
| SUB-ASSEMBLY DRAWINGS | 4 | 3 | | 1 | | | |
| PACKAGE ASSEMBLY DRAWINGS | 4 | 2 | | 1 | | | |
| PACKAGED COMPONENT DRAWINGS | 4 | 2 | | 1 | | 5 | |
| PCB DRAWINGS | 4 | 3 | | | | | |
| SCHEMATIC DRAWINGS | 1 | 1 | | | | | |
| CHANGE ORDER | | 1 | | | | | |
| OTHER DRAWINGS | | | | | | | |

METADATA ENTRY — 100

| Field | Value | Ref |
|---|---|---|
| SERIAL NO. | 1999836 | 100a |
| CREATED ON | 06/01 | 100b |
| CREATED BY | TANAKA | 100c |
| LOCATION | TOKYO FOURTH ENGINEERING DEPT. | 100d |
| PRODUCT CATEGORY | CAMERA/PRINTER | 100e |
| PRODUCT TYPE CODE | LX11 | 100f |
| SPECIFICATION CODE | K50011D | 100g |
| APPLICATION CLASS | DXF | 100h |

OK — 100i
CANCEL — 100k

```
                    ┌─ 110
┌──────────────────────────────────────────────────┐
│ DISTRIBUTION SETUP                    [_][□][×]  │
```

| | | | | |
|---|---|---|---|---|
| SERIAL NO. | 1999836 | REQUESTED ON | 06/01 | |
| REQUESTED BY | YAMAMOTO | | | |
| CHECKED BY/ON (1) | TANAKA | 05/27 | (2) KAWAGUCHI | 05/26 |
| APPROVED BY | NAKAO | APPROVED ON | 06/01 | |
| ARCHIVED BY | TAGUCHI | ARCHIVED ON | 06/01 | |

110a

PRODUCT TYPE — 110b

| TYPE | SPECIFI-CATION CODE | ROUTE | CHANGED FROM | REMARKS |
|---|---|---|---|---|
| LX-11 | K50011 | | | |
| LX-12 | K50012 | | | |
| | | | | |

110g, 110f, 110h

COMPONENT — 110c

| TITLE | SPECIFICATION CODE |
|---|---|
| BOTTOM CASE ASSEMBLY | K50011D |
| UNIT ASSEMBLY | K50012B |
| | |

110j, 110i, 110k

FILE — 110d

| OUTPUT | TITLE | SPEC CODE | CAUSE | CLASS | DISTRIBUTE TO |
|---|---|---|---|---|---|
| ✓ | UNIT ASSEMBLY DRAWING | K50011D | | | |
| ✓ | BILL OF MATERIALS | K50012B | | | |

110m, 110l, 110n

REPORT — 110e

| OUTPUT | REPORT NO. | SUBJECT | CREATED BY | CREATED ON | OUTPUT TO |
|---|---|---|---|---|---|
| ✓ | CL98001 | ENGINEERING CHANGE ORDER | | | |

110o

| PREV | NEXT | EDIT | DATE | SEND | CANCEL |
|---|---|---|---|---|---|

DOCUMENT LIST — 160

160a:
- SERIAL NO.: 1999836
- REQUESTED ON: 06/01
- REQUESTED BY: YAMAMOTO
- CHECKED BY/ON (1): TANAKA 05/27 (2) KAWAGUCHI 05/26
- APPROVED BY: NAKAO
- APPROVED ON: 06/01

160b — PRODUCT TYPE:

| TYPE | SPECIFICATION CODE | ROUTE | CHANGED FROM | REMARKS |
|---|---|---|---|---|
| LX-11 | K50011 | | | |
| LX-12 | K50012 | | | |
| | | | | |

(160g, 160f, 160h)

160c — COMPONENT:

| TITLE | SPECIFICATION CODE |
|---|---|
| BOTTOM CASE ASSEMBLY | K50011 |
| UNIT ASSEMBLY | K50012 |
| | |

(160j, 160i, 160k)

160d — FILE:

| TITLE | SPEC CODE | CAUSE | CLASS | REMARKS |
|---|---|---|---|---|
| UNIT ASSEMBLY DRAWING | K50011D | | | |
| BILL OF MATERIALS | K50012D | | | |

(160m, 160l, 160n)

160e — REPORT:

| REPORT NO. | SUBJECT | CREATED BY | CREATED ON |
|---|---|---|---|
| CL98001 | ENGINEERING CHANGE ORDER | | |

Buttons: DOWNLOAD (160p), ACK (160q), OUTPUT (160r), CANCEL (160s)

DATA DELIVERY SYSTEM AND SENDING STATION THEREFOR

BACKGROUND OF THE INVENTION

1. Field of the Invention

The present invention relates to a data delivery system, and more particularly to a data delivery system which transports data that has previously been stored in a sending station to at least one receiving station. The present invention further relates to a sending station which serves as part of the data delivery system, and a computer-readable storage medium storing a program which causes a computer system to function as a sending station.

2. Description of the Related Art

There has been a trend in recent years for manufacturing companies to produce a wide variety of goods in high quantities, confronting shortened product lifecycles and diversified consumer needs. Those companies have consequently accumulated a large volume of document data including engineering drawings created with computer-aided design and engineering (CAD/CAE) tools. They have to store and manage such document data efficiently, as well as to quickly retrieve what they need. In this area of interest, product data management (PDM) systems are proposed as suitable facilities for providing necessary services. PDM systems are designed to manage product data in an organized and unified manner, from development phase to production phase. Besides preventing any document-related problems from happening, they improve the productivity of engineering processes by maximizing the reuse of design data.

In such conventional PDM systems, engineering drawings and other documents are delivered in digital form to internal and external organizational units that need them, by referring to destination tags attached to the data and utilizing workflow paths. Although this has been a common way of data distribution in conventional systems, it is likely to raise some reliability issues because the process depends on management by humans. In some cases, data files may be delivered to unintended places, or some necessary destinations may be left out. Conventional PDM systems also lack an affinity for firewall devices. To protect important data against tampering and theft, most systems deploy a firewall at the point where they are connected to a public network environment. Firewall devices, however, often slow down the rates of data transport, causing slow system response.

SUMMARY OF THE INVENTION

Taking the above into consideration, an object of the present invention is to provide a sending station that can distribute engineering drawings and other data in a more reliable way.

To accomplish the above object, according to the present invention, there is provided a sending station which delivers data stored in its internal or external storage unit to at lease one receiving station. This sending station comprises the following elements: an attribute identification unit which identifies the attributes of data to be distributed; a destination determination unit which determines the destinations of the data according to the attributes identified by the attribute identification unit; and a transmitter which sends the data to the destinations determined by the destination determination unit.

Further, another object of the present invention is to provide a data delivery system which does not slow down the response of the entire system even when a firewall is employed therein.

To accomplish the second object, according to the present invention, there is provided a data delivery system for delivering data stored in a sending station to at least one receiving station. This system comprises the following elements: an attribute identification unit which identifies the attributes of data to be distributed; a destination determination unit which determines the destinations of the data according to the attributes identified by the attribute identification unit; a transmitter which sends the data to the destinations determined by the destination determination unit; a receiver unit which receives the data sent from the transmitter; and a reproduction unit which restores the data received by the receiver to its original form.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram which shows an example of a distribution table listing screen;

FIG. 4 is a diagram which shows an example of a distribution table editing screen;

FIG. 8 is a diagram which shows an example of a metadata entry screen;

FIG. 11 is a diagram which shows an example of a distribution setup screen;

FIG. 17 is a diagram which shows an example of an item listing screen;

DESCRIPTION OF THE PREFERRED EMBODIMENTS

Preferred embodiments of the present invention will be described below with reference to the accompanying drawings.

Figure 1:
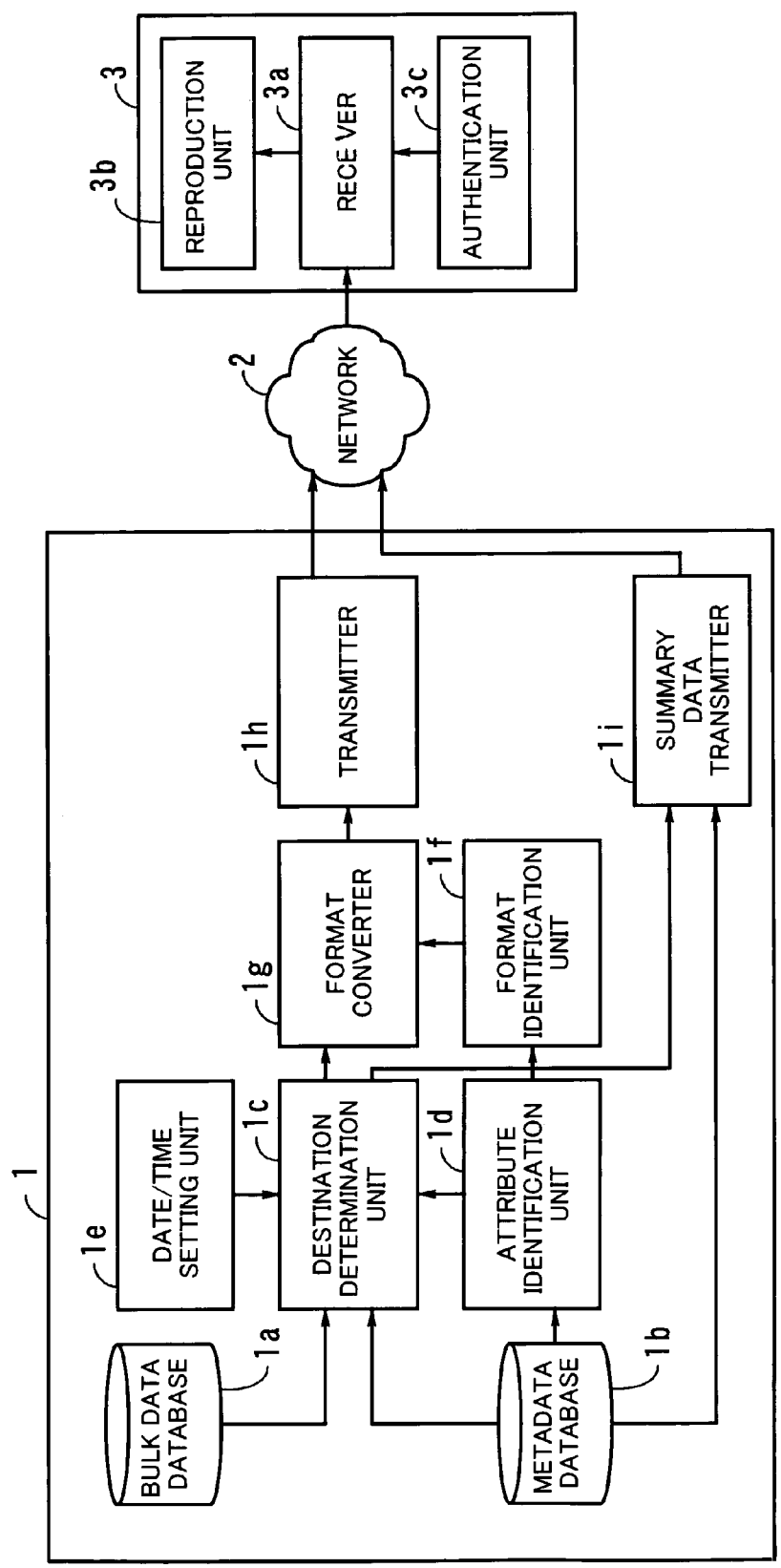
FIG. 1 is a conceptual view of the present invention.

FIG. 1 is a conceptual view of a data delivery system according to the present invention. This system comprises a sending station 1 and a receiving station 3, which are interconnected by a network 2. While FIG. 1 illustrates only one receiving station for the purpose of simplicity, it should be appreciated that a plurality of like receiving stations are connected in a real-world system.

The sending station 1 comprises a bulk data database 1a, a metadata database 1b, a destination determination unit 1c, an attribute identification unit 1d, a date/time setting unit 1e, a format identification unit 1f, a format converter 1g, a transmitter 1h, and a summary data transmitter 1i. The bulk data database 1a stores document data files called "bulk data" files. Here, the term "bulk data" refers to such data as engineering drawings and other like documents. The metadata database 1b stores "metadata" files, i.e., the attributes and other information that describe each unit of bulk data being stored in the bulk data database 1a. When the transmission of certain bulk data files is requested, the destination determination unit 1c determines the destinations of the requested bulk data files according to their attribute information identified by the attribute identification unit 1d. The attribute identification unit 1d consults the metadata database 1b to find the attributes of the requested bulk data files.

The date/time setting unit 1e is used to specify a desired date and time of data transmission. The format identification unit 1f identifies which data format each receiving station can handle, and sends this information to the format converter 1g. The format converter 1g receives a bulk data file, whose destination has been identified by the destination determination unit 1c, and if necessary, it converts the format of the given bulk data file, as specified by the format identification unit 1f. The transmitter 1h temporarily stores such converted data files, and sends them out when it is requested by the receiving station 3 and the requesting user is successfully authenticated. The summary data transmitter 1i compiles summary data which briefly explains the bulk data files to be distributed, referring to relevant metadata files in the metadata database 1b. The summary data transmitter 1i sends this summary data to the receiving station 3 in advance of transmission of the requested bulk data files. The network 2 interconnects the sending station 1 and receiving station 3, allowing them to exchange the above data files and messages.

The receiving station 3 comprises a receiver 3a, a reproduction unit 3b, and an authentication unit 3c. The receiver 3a receives data from the sending station 1. The reproduction unit 3b reproduces the original data from the data received by the receiver 3a, and displays it on a monitor screen or other output device (not shown). The authentication unit 3c performs an authentication process to verify whether the current user is an authorized user. If the user has passed this test, the authentication unit 3c so notifies the sending station 1.

The above data delivery system operates as follows. Suppose, for example, that a set of engineering drawings have just been entered to the bulk data database 1a as new drawing data files. This causes the sending station 1 to produce a record of its registration date, serial number, and other necessary data. This record is then stored into the metadata database 1b as a new entry. Further, the sending station 1 prompts the user to input various attribute information about the drawing data files. This information is also registered to the metadata database 1b.

When the user enters a command to distribute the stored drawing data files to other stations, the sending station 1 executes this command as describe below. Here, the sending user may wish to designate a specific date and time of data transmission by using the date/time setting unit 1e. In that case, what is described in the next section will happen at the scheduled time.

First, the attribute identification unit 1d retrieves a relevant metadata file from the metadata database 1b to obtain the attributes of the drawing data files to be transmitted. Referring to this attribute information identified by the attribute identification unit 1d, the destination determination unit 1c determines where to send those data files. Suppose, for example, that the user is sending engineering diagrams for a certain electronic circuit module, the destinations of the drawing data should include: a factory having a relevant fabrication line, and the purchasing department which is responsible for the procurement of necessary components. To automatically determine the destinations as such, the sending station 1 has a lookup table that defines the relationships between the attribute information and destinations of every unit of drawing data.

On the other hand, the format identification unit 1f consults the metadata database 1b via the attribute identification unit 1d to identify which data format each receiving station supports. The result is then passed to the format converter 1g. If the current data format is not compatible with the identified format, the format converter 1g performs data format conversion accordingly.

The summary data transmitter 1i is also activated by the destination determination unit 1c when the destinations of the drawing data files are determined. That is, the summary data transmitter 1i retrieves a relevant metadata file from the sending station 1 and stores it as the source of summary data that describes the drawing data of interest. This summary data will be transmitted later to the receiving station 3 when it logs in to the sending station 1 via the network 2.

Consider here that the user sitting at the receiving station 3 has issued a command to download the data from the sending station 1. The receiving station 3 now presents a certain screen on its monitor unit (not shown), prompting the user to enter his/her log-in name and password. The user then types in his/her name and password in this screen. In response to this, the authentication unit 3c determines whether the requesting person is an authorized user. If his/her authenticity is successfully verified, the authentication unit 3c will so notify the sending station 1. Here, the network 2 serves as a bidirectional communication medium, although FIG. 1 only shows a unidirectional path from the sending station 1 to the receiving station 3.

In response to the notification of authenticity, the summary data transmitter 1i in the sending station 1 sends out the summary data to the receiving station 3, retrieving it from the local storage. On the receiving side, the receiver 3a takes in the summary data sent from the sending station 1, and the reproduction unit 3b restores it into the original form, so that the summary information will appear on the monitor unit (not shown). Now the receiving user can view the profile of what the sending station 1 intends to provide, and he/she specifies which bulk data files should be downloaded. This information is sent back to the sending station 1. On the sending side, the transmitter 1h retrieves the specified bulk data files from the bulk data database 1a and sends them out to the receiving station 3 over the network 2. Those files are accepted by the receiver 3a in the receiving station 3 and passed to the reproduction unit 3b so as to obtain the original bulk data. When such an acceptance processing for the bulk data files is successfully completed, the receiving station 3 returns a predetermined message to notify the sending station 1 of the completion. The sending station 1 takes this message as a positive acknowledgment of the transmitted data.

As described above, the data delivery system of the present invention will automatically determine the destinations of drawing data, when the sending user enters it to a database and instructs the system to distribute its copies. This function ensures that the drawing data will be delivered to all the parties that need it. Further, the proposed data delivery system is configured to provide summary data before sending the main part of the drawing data (i.e., bulk data). This function allows the user to make a choice for the time of downloading. When the network 2 appears to be in a high traffic condition, he/she may decide not to download bulk data files for a while, but wait until the traffic is reduced. The proposed system is also advantageous in that it employs a format converter 1g to convert data formats in accordance with the individual requirements of receiving stations, thus alleviating workloads imposed on the receiving users.

Referring again to the system's conceptual view (FIG. 1), the bulk data database 1a and metadata database 1b are implemented as an integral part of the sending station 1. The present invention, however, should not be limited to this particular configuration, but those databases may also be realized as external devices being coupled to the sending station 1.

Figure 2:
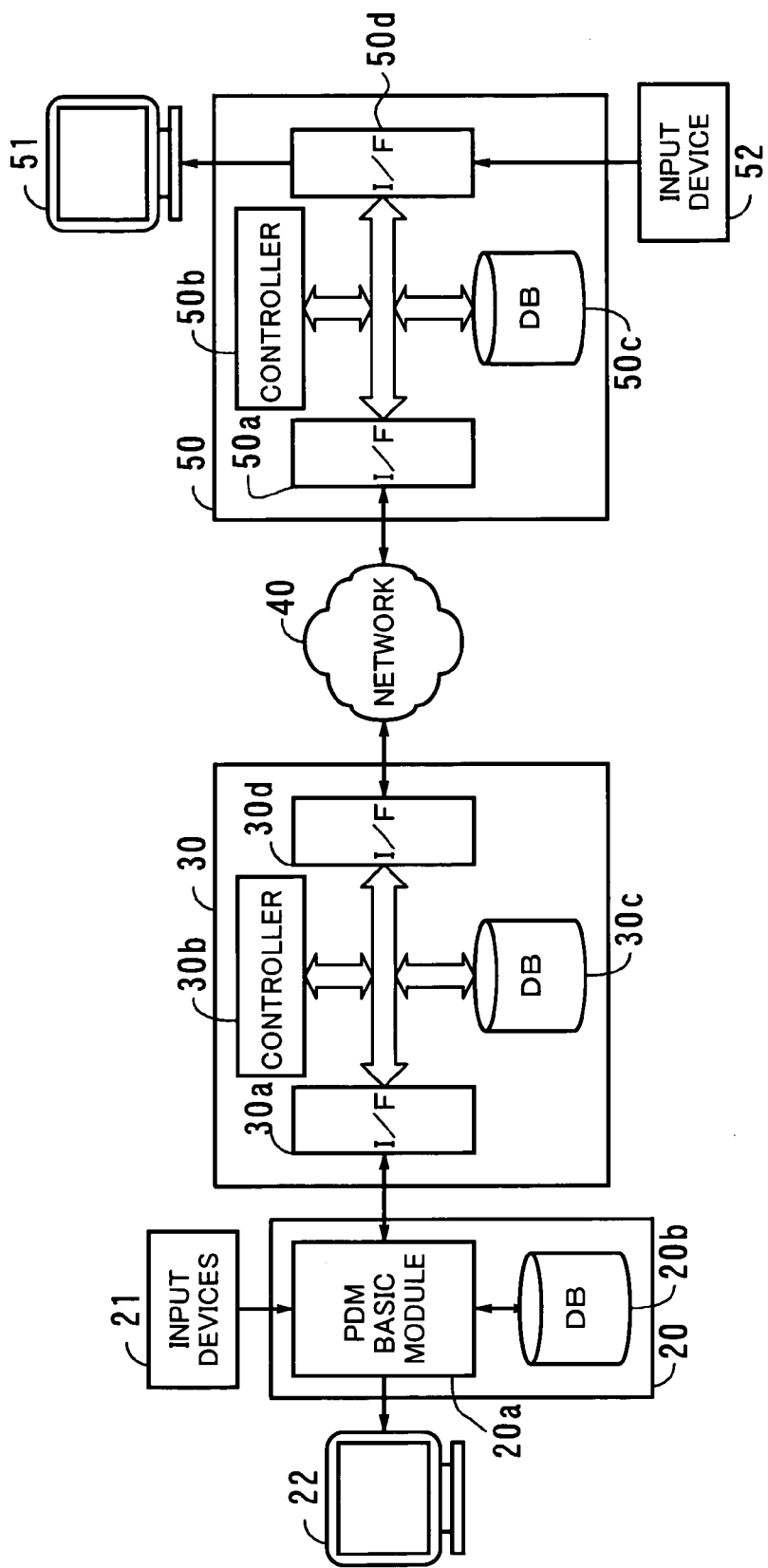
FIG. 2 is a diagram which shows an embodiment of the present invention.

Referring next to FIG. 2, a specific embodiment of the present invention will now be described below. FIG. 2 is a block diagram of a data delivery system embodying the present invention, which comprises a PDM basic unit 20, a distribution server 30, a network 40, and a receiving station 50.

The sending user interacts with the PDM basic unit 20, using input devices 21 and a monitor unit 22. The PDM basic unit 20 comprises a PDM basic module 20a and a database (DB) 20b. The database 20b stores data files that have entered through input devices 21. When the transmission of specific documents is requested, the PDM basic unit 20 reads out relevant data files from the database 20b and supplies them to the distribution server 30.

The distribution server 30 comprises an interface (I/F) 30a, a controller 30b, a database 30c, and another interface 30d. The first interface 30a converts the data format so that the distribution server 30 will be able to send and receive data to/from the PDM basic unit 20. Besides controlling other parts of the distribution server 30, the controller 30b provides various processing services according to the programs stored in its local storage (not shown). The database 30c stores data files, separately for each destination, which were supplied from the PDM basic unit 20. When a specific document is requested by the receiving station 50, the database 30c supplies the interface 30d with relevant files for distribution. The database 30c also stores various tables and other necessary data for a data distribution session. The second interface 30d converts given data into an appropriate format so that the distribution server 30 will be able to send and receive data to/from the receiving station 50 via the network 40. The network 40 interconnects the distribution server 30 and receiving station 50, allowing them to exchange information.

The receiving station 50 comprises an interface (I/F) 50a, a controller 50b, a database (DB) 50c, and another interface 50d. The first interface 50a converts the data format so that the receiving station 50 will be able to send and receive data to/from the distribution server 30 via the network 40. The controller 50b provides various processing services according to the programs stored in its local storage (not shown), besides controlling other parts of the receiving station 50. The database 50c stores data files that is sent from the distribution server 30. The second interface 50d receives data from the controller 50b and converts it into a video signal to drive an external monitor unit 51. It also accepts data from input devices 52 and supplies it to the controller 50b after converting its format, if necessary. The input devices 21 and 52 include a keyboard and mouse, for example. They may also include network interface devices for remote access, such as LAN (local area network) cards for receiving data from remote data terminals.

The following section will now describe the operation of the above data delivery system embodying the present invention, focusing on the following two specific topics: (1) how the system defines the destinations of documents, and (2) how the system distributes data files. More specifically, the first part will discuss a process of editing (or creating) a distribution table which defines the destinations of each particular class of engineering documents.

Referring to FIG. 2, it is assumed here that a user (not shown) is operating the input devices 21 of the PDM basic unit 20. Now suppose that he/she has issued a command that requests a listing of distribution tables. In response to this, the PDM basic module 20a retrieves distribution tables from the database 30c in the distribution server 30, and displays them with a predetermined layout. FIG. 3 illustrates a typical screen that appears on the monitor unit 22 in the above context.

In the screen of FIG. 3, a window 60 titled "Distribution Table List" is provided. To allow the user to specify the document release level, a text box 60a is placed at the upper-left portion of the window 60, together with a drop-down arrow 60b for opening a list of selectable items for the text box 60a. The example screen shows that the current choice is "Final Release."

The window 60 has two main sections 60c and 60d being aligned vertically. The first section 60c is used to show a list of distribution tables, each of whose entries has the following fields: "Title" (name of distribution table), "created by" (name of person who created this), "Crated on" (creation date), and "Last Updated on" (date of most recent update). At the right-hand end of this section 60c, a scroll box 60e and scroll arrows 60f and 60g are provided for moving through the list in the vertical direction. The second section 60d, located under the section 60c, is used to provide contact information related to the distribution list that is currently selected. In the example screen of FIG. 3, the second section 60d shows two contact persons who are both related to "Camera/Printer" products, the distribution table of which is found as the first entry of the distribution table list. At the right hand end of the section 60d, a scroll box 60h and scroll arrows 60i and 60j are provided for moving through the list in the vertical direction.

Further, the following command buttons are arranged at the bottom of the window 60: a NEW button 60k, a MODIFY button 60l, a COPY button 60m, a DELETE button 60*n*, and a CANCEL button 60*o*. The NEW button 60*k*, when it is pressed, will take the user to another screen ("Distribution table editing screen") for defining and editing a new distribution table. The layout of this screen is shown FIG. 4, although this FIG. 4 shows a situation where an existing distribution table is being edited. Referring back to FIG. 3, it has to be noted that the NEW button may be unavailable (i.e., it may appear shaded) when any one of the existing distribution tables is selected.

The MODIFY button 60*l*, on the other hand, opens a distribution table editing screen shown in FIG. 4, if it is pressed while a particular distribution table is selected. When none of the distribution tables is selected, the MODIFY button 60*l* appears shaded. The COPY button 60*m* is used to create a distribution table similar to another table. That is, when the user selects a specific distribution table and then presses this COPY button 60*m*, the system will duplicate the contents of the currently selected distribution table for a new distribution table. The DELETE button 60*n* removes a specific entry of a distribution table, when it is selected. The CANCEL button 60*o* is used to cancel the current data entry and leave the distribution table listing screen.

Figure 5:
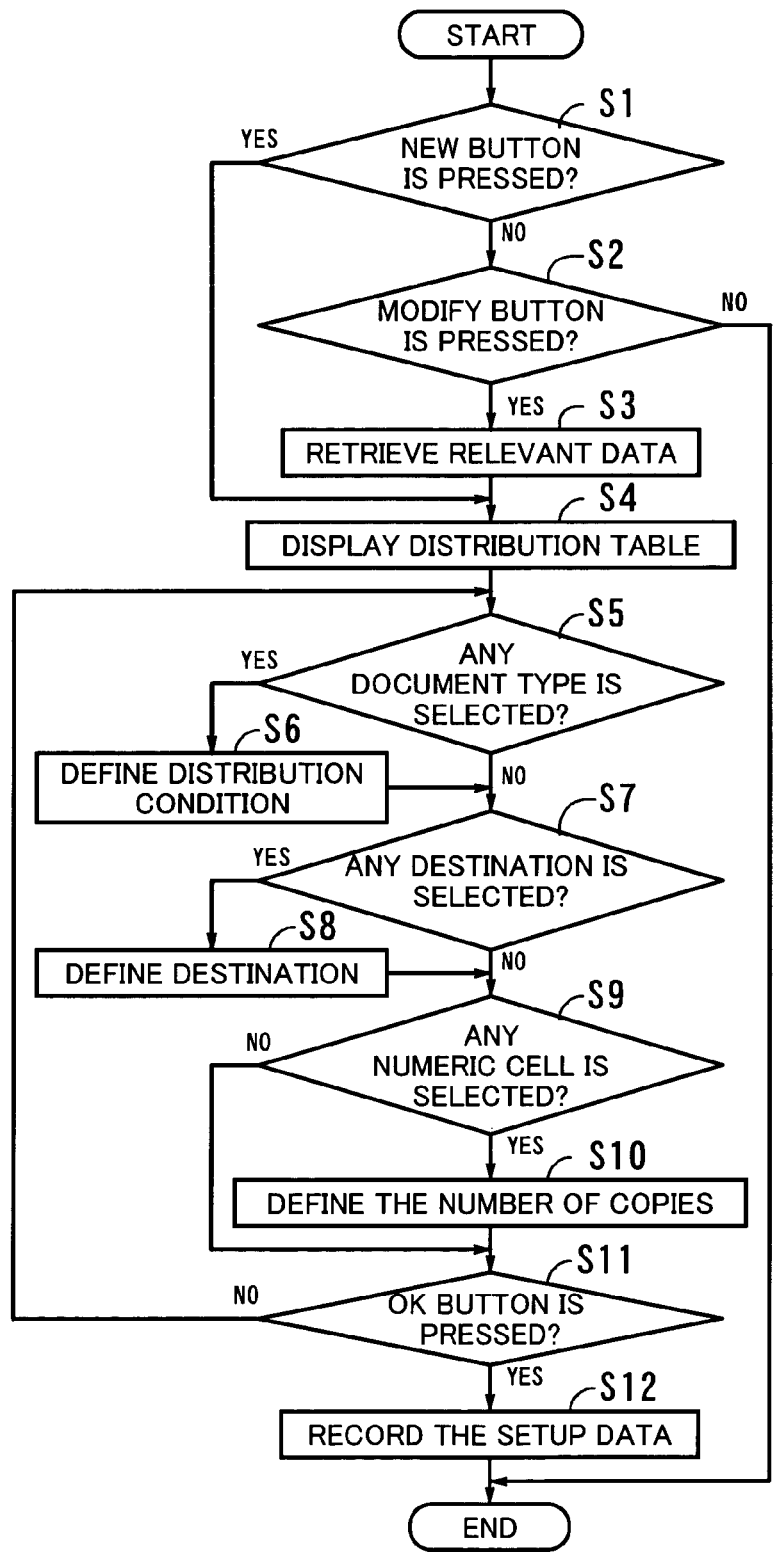
FIG. 5 is a flowchart which explains a process to be executed when a NEW button or MODIFY button is pressed in the distribution table listing screen shown in FIG. 3.

Consider here that the user has pressed the NEW button 60*k* or MODIFY button 60*l*. Referring now to the flowchart of FIG. 5, a typical process executed in such a case will be explained below. This process comprises the following steps.

(S1) Checking the status of the input devices 21, the PDM basic module 20*a* examines whether the NEW button 60*k* is pressed. If so, the process advances to step S4. If not, it proceeds to step S2.

(S2) Checking the status of the input devices 21, the PDM basic module 20*a* examines whether the MODIFY button 60*l* is pressed. If so, the process advances to step S3. If not, the process is terminated.

(S3) The PDM basic module 20*a* makes access to the distribution server 30 to obtain relevant records that are necessary to display an editing screen for the distribution table currently selected in the listing section 60*c* (FIG. 3).

(S4) The PDM basic module 20*a* displays a distribution table editing screen (FIG. 4) on the monitor unit 22. This screen offers a new blank table when it is invoked by the NEW button 60*k*. In the case of the MODIFY button 60*l*, it retrieves and displays the existing distribution table specified by the user.

In the specific example shown in FIG. 4, a window 70 titled "Distribution Table Editor" is provided. As in the window 60 of FIG. 3, this window 70 has a text box 70*a* with a button 70*b* for selecting a specific document release level. Located under the text box 70*a* is a listing section 70*c* where the associations between various kinds of drawings and their destinations are defined in matrix form. The first row of this distribution table, for example, indicates that four copies of component drawings are to be distributed to Production Planning Section, one copy to Fourth Engineering Group, and five copies to Mold Coordination Section. There are three command buttons 70*d* to 70*f* to provide the following functions. That is, the PRINT button 70*d* is used to print out the displayed table. The user presses the OK button 70*e* to send the entered or updated table to the system. The CANCEL button 70*f* is used to cancel the current data entry and leave the screen.

(S5) The PDM basic module 20*a* examines whether any specific drawing type is selected from the table in the section 70*c*. If a selection is made, the process advances to step S6. Otherwise, the process proceeds to step S7. It is assumed in the present example of FIG. 4 that the user selects the row titled "Component Drawings" in the table. This makes the PDM basic module 20*a* move to step S6.

Figure 6:
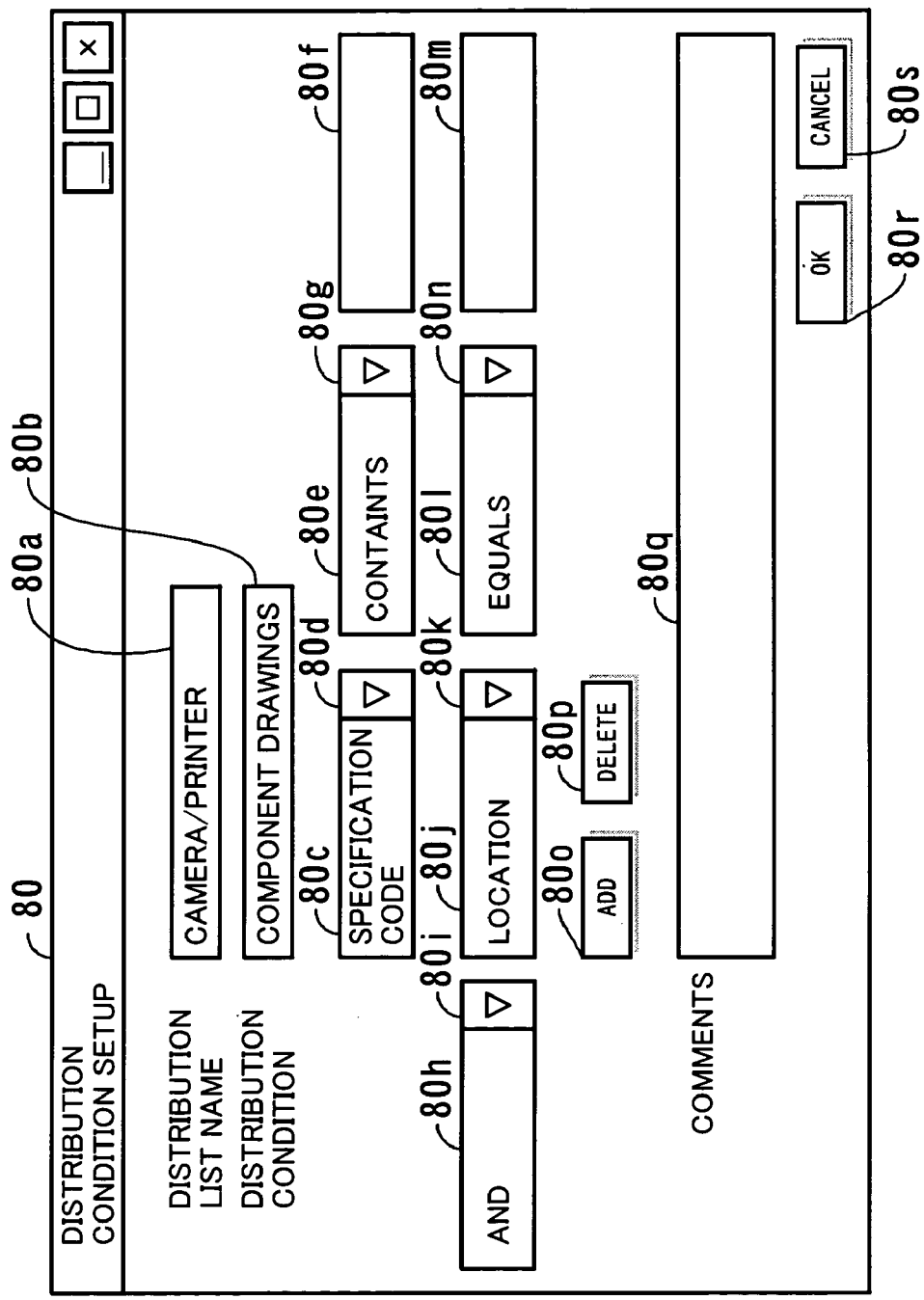
FIG. 6 is a diagram which shows an example of a distribution condition setup screen.

(S6) The PDM basic module 20*a* displays another window 80 shown in FIG. 6 on the monitor unit 22 to allow the user to edit or define a distribution condition.

The example screen of FIG. 6 provides a window 80 titled "Distribution Condition Setup." This window 80 has a text box 80*a* indicating the name of the distribution table of interest, which is "Camera/Printer" in the present example. Another text box 80*b*, located under the first text box 80*a*, shows the name of the distribution condition being edited, which is "Component Diagram" in the present example.

The distribution condition is represented generally as a concatenation of multiple logical expressions. In FIG. 6, they are defined in a group of text boxes 80*c*, 80*e*, 80*f*, 80*h*, 80*j*, 80*l*, and 80*m* being arranged in two lines, each line representing a single logical condition. More specifically, the text box 80*c* is used to enter the subject of a first logical condition, which is "Specification Code" in the present example. The user can fill this field with another value, such as "Attribute Name," by selecting an appropriate item from a drop-down list, which appears when a drop-down arrow 80*d* is pressed. The subject in the text box 80*c* is followed by a predicate consisting of an operator field and keyword text, which are specified in the text boxes 80*e* and 80*f*, respectively. A drop-down arrow 80*g* is attached to the text box 80*e*. The user can put his/her choice into the text box 80*e* by selecting it from a drop-down list that appears when he/she presses the arrow 80*g*. The operator in the text box 80*e* describes how the subject should match with the specified keyword. In the present example, an operator "contains" is selected in the text box 80*e*. The three text boxes 80*c* to 80*f* now form a specific logical condition that becomes "true" when the "Specification Code" field contains a given keyword.

The next line begins with a text box 80*h* for specifying a conjunctive operator that joins the two lines of logical conditions. It is set to "AND," in the present example, meaning that the distribution condition holds when the two conditions are both true. As in the case of other text boxes, the user can set an appropriate logical operator to this text box 80*h* by pressing a drop-down arrow 80*i* and selecting an item from a drop-down list that appears consequently.

The three neighboring text boxes 80*j*, 80*l*, and 80*m* define the second logical condition. The text box 80*j* gives the subject of this second condition, which is set to "Location" is the present example. The user can fill this field with another value by using a drop-down list that appears when a drop-down arrow 80*k* is pressed. The subject in the text box 80*j* is followed by a predicate consisting of an operator field and keyword text, which are specified in the text boxes 80*l* and 80*m*, respectively. The operator in the text box 80*l* describes how the subject should match with the keyword specified in the text box 80*m*. The user can set an appropriate operator to this text box 80*h* by pressing a drop-down arrow 80*n* and selecting an item from a drop-down list that appears consequently. Because an operator "equals" is selected in the present example, the second logical condition becomes "true" when the "Location" field equals the specified keyword.

The user can expand or shrink the definition of a distribution condition by using ADD and DELETE buttons 80*o* and 80*p*. The ADD button 80*b*, when it is pressed, produces an additional set of text boxes to concatenate a new logical condition. The DELETE button 80*p* is used, in turn, to delete a specific line of logical condition.

The illustrated window 80 further provides a larger text box 80*q* for writing comments or the like. Placed at the bottom of the window 80 are an OK button 80*r* and a CANCEL button 80*s*. The OK button 80*r* is used to enable the current setup, while the CANCEL button 80*s* is used to cancel the data entry and leave the present screen.

(S7) The PDM basic module 20*a* examines whether the user has selected any specific destination from among those shown in the section 70*c* (FIG. 4). If so, the process advances to step S8. Otherwise, the it proceeds to step S9.

Figure 7:
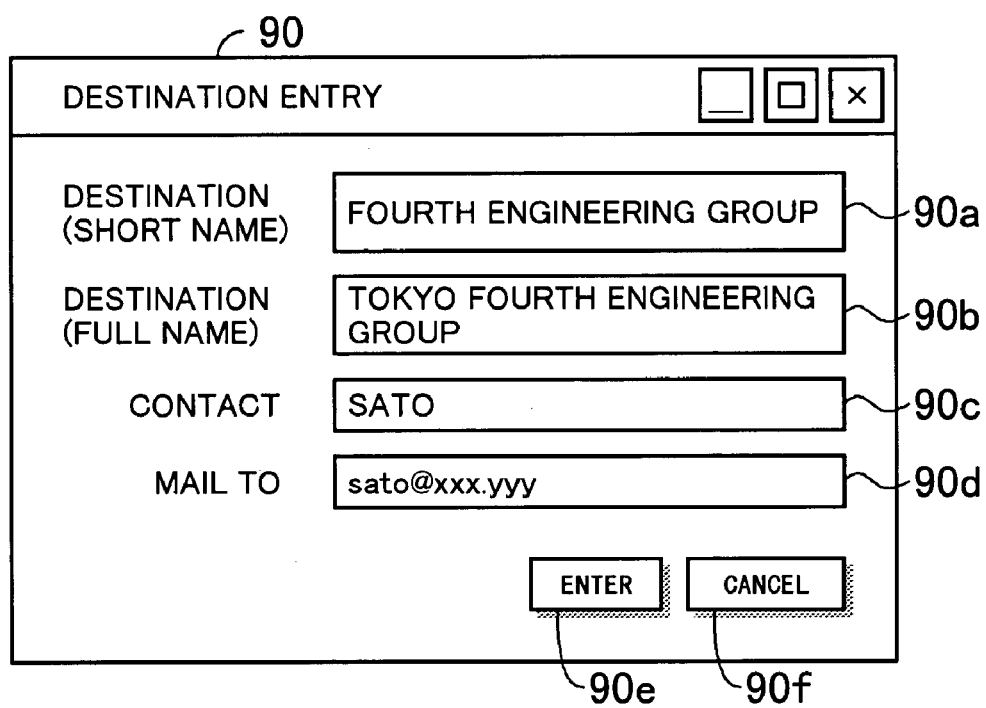
FIG. 7 is a diagram which shows an example of a destination entry screen.

(S8) The PDM basic module 20*a* displays another window 90 on the monitor unit 22 to allow the user to define a destination, as shown in FIG. 7. In this example, the window 90 is titled "Destination Entry." At the top of the window 90, there is a text box 90*a* for entering the short name of the destination of interest, which is followed by another text box 90*b* for entering the full name of the same. In the present example, those two text boxes 90*a* and 90*b* hold the names "Fourth Engineering Group" and "Tokyo Fourth Engineering Group," respectively. The next two text boxes 90*c* and 90*d* are used to enter the name of a contact person and his/her e-mail address, which are "Sato" and "sato@xxx.yyy" in the present example. To record the above setup, the user presses an ENTER button 90*e*. A CANCEL 90*f* button allows him/her to cancel the current entry.

(S9) The PDM basic module 20*a* examines whether the user has selected any particular numeric cell in the destination table shown in the section 70*c*. If so, it means that the user wishes to modify the number of copies to be delivered to a specific destination, and thus the process advances to step S10. Otherwise, it proceeds to step S11.

(S10) The PDM basic module 20*a* executes a process to set or update the number of copies to be distributed. That is, the user has selected a particular numeric cell in the distribution table by using the input devices 21 at step S9, and he/she now types in a particular number for that cell by using the input devices 21. Accordingly, the PDM basic module 20*a* updates the distribution table with the new numeric parameter entered by the user.

(S11) The PDM basic module 20*a* examines whether the user has pressed the OK button 70*e* (FIG. 4). If so, the process advances to step S12. If not, the process returns to step S5 to repeat the above operations.

(S12) The PDM basic module 20*a* supplies the distribution server 30 with all the setup parameters obtained through the above process, so that the database 30*c* will be updated with them.

Through the above steps, the user can create or modify a distribution table, which defines the association between the attributes and destinations of various kinds of drawings. The system records such distribution tables in its database 30*c*. Now that distribution tables are available, the PDM basic unit 20 accepts and records newly created engineering documents and then delivers them to their respective destinations according to the distribution tables. The next part of the description will focus on these processes.

Assume here that a new engineering document is finished and supplied to the PDM basic unit 20 through the input devices 21. The PDM basic module 20*a* stores this document as a bulk data file into a predetermined portion of the database 20*b*. It also creates metadata, or attributes (e.g., serial number, author's name) of the document and saves it into the database 20*b* together with the bulk data file.

Further, as shown in FIG. 8, the PDM basic unit 20 opens a window 100 on the monitor unit 22, to accept other attribute information from the user. This example window 100 is titled "Metadata Entry." At the top line of the window 100, there are two text boxes 100*a* and 100*b* to show the serial number and creation date of the bulk data file, which are automatically generated, by the PDM basic unit 20. In the present example, those text boxes show a serial number "1999836" and a timestamp "06/01." Text boxes 100*c* and 100*d* on the next line are used to enter the name of the person who created the document and the location where he/she is stationed. In the present example, those text boxes show that the drawings are created by an engineer named "Tanaka" who is working as a member of "Tokyo Fourth Engineering Department." Entered to the next text boxes 100*e* and 100*f* are a relevant product category and product type code, which are respectively set to "Camera/Printer" and "LX11" in the present example. On the next line, two text boxes 1008 and 100*h* show the specification code and application class, which are set respectively to "K50011D" and "DXF" in the present example. The "Specification Code" field is automatically filled by the system, based on the above-noted product type code and location. The "Application Class" field indicates which application program was used to create the bulk data file of interest. To record the above metadata entry, the user presses an OK button 1001. Or he/she may cancel the current entry by pressing a CANCEL button 100*k*.

Figure 9:
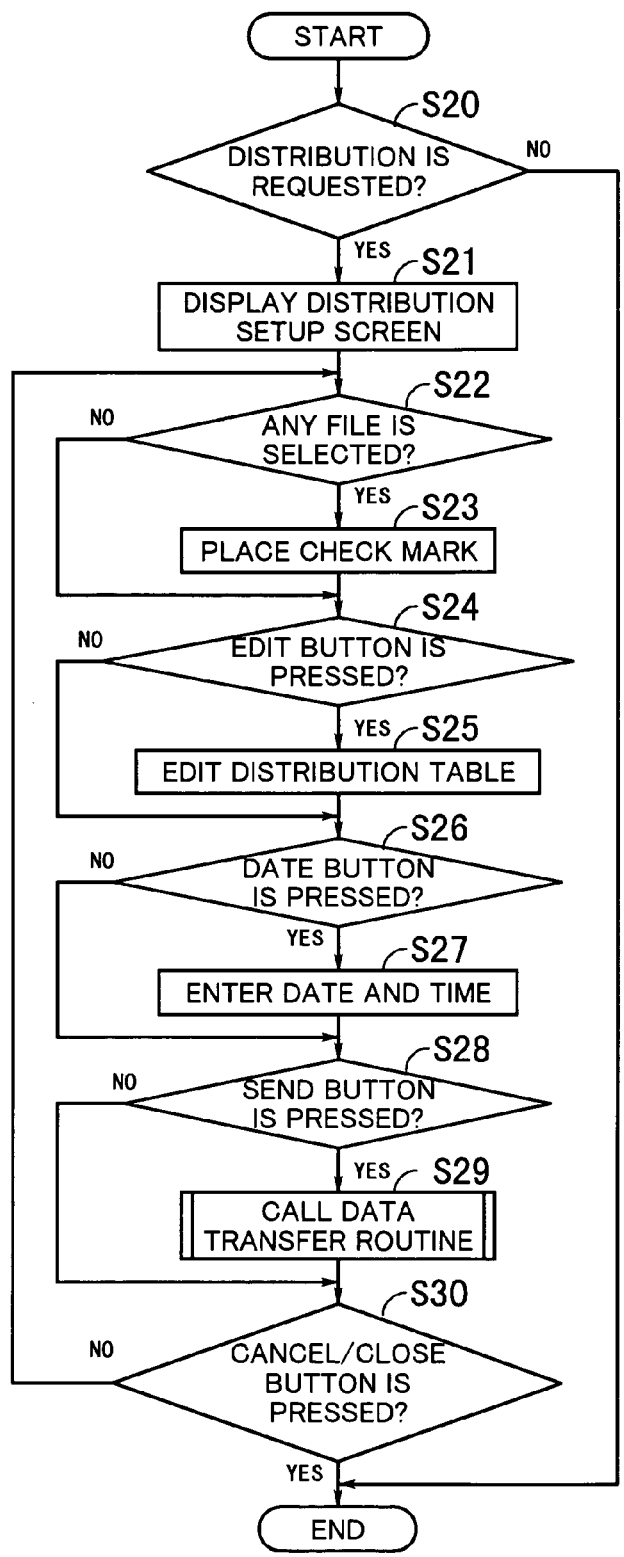
FIG. 9 is a flowchart which explains a process to be executed when a user directs a PDM basic unit (FIG. 2) to distribute data that has previously been recorded therein.

Suppose, in the present context, that the user has entered necessary parameters in the screen of FIG. 8 and pressed the OK button 100*i*. Then the PDM basic module 20*a* collects and saves them into the database 20*b* as a new entry of metadata. After that, the user operates the input devices 21 to command the system to distribute the stored document. This command invokes a process shown in the flowchart of FIG. 9, which comprises the following steps.

(S20) The PDM basic module 20*a* examines whether the user has directed the distribution of a document. If so, the process advances to step S21. If not, the process is terminated.

(S21) The PDM basic module 20*a* displays a distribution setup screen on the monitor unit 22, as illustrated in FIG. 11. This example screen provides a window 110 titled "Distribution Setup," which is divided into the following five sections 110*a* to 100*e*.

The top section 110*a* of the window 110 shows attributes of an engineering document to be distributed, which include the following information fields. The field titled "Serial No." holds a number that is assigned to each document in consecutive order when it is recorded in the database 20*b*. The fields titled "Requested on" and "Requested by" respectively show when the data distribution was requested and who made the request. The field titled "Checked by/on" consisting of two sets of consecutive sub-fields indicates who checked the document and when they checked it. The next two fields titled "Approved by" and "Approved on" show who approved the document and when he/she approved it. Further, the fields titled "Archived by" and "Archived on" show who archived the document and when he/she archived it.

The second section 110b of the window 110 presents a list of product types that are relevant to the document to be distributed. This list has a scroll box 110f and scroll arrows 110g and 110h for the user to move through the list in the vertical direction.

The third section 110c of the window 110 presents a list of components that are relevant to the document to be distributed. This list also has a scroll box 110i and scroll arrows 110j and 110k for scrolling through the information in the vertical direction.

Further, the fourth section 110d of the window 110 contains a list of file names to show which files are to be distributed. The user may use a scroll box 110l and scroll arrows 110m and 110n to scroll through the list in the vertical direction. A check box is placed on the left of each file name so that the user can select specific files by clicking their check boxes. Although the list may include many file name entries, only the selected files will be distributed finally.

The fifth section 110e of the window 110 presents information about a file that contains descriptions and comments on the document to be distributed. In the present example, this file is titled "Engineering Change Order" and assigned an report number (serial number) "CL98001." This file will be distributed together with the document files when the check box on the left of the order number is selected. An arrow 110o on the far right is used to view other like information in the list, if any.

At the bottom of the window 110, six command buttons 110p to 110u are provided. The PREV button 110p on the far left is used to move to the previous page. The NEXT button 110q is used to move to the next page. The EDIT button 110r opens a screen for viewing and editing a distribution table (described later). The DATE button 110s is used to specify a date and time of data transmission. The SEND button 110t initiates a session of data distribution. The CANCEL button 110u is used to cancel the current entry.

(S22) The PDM basic module 20a examines whether the user has selected a specific file. If so, the process advances to step S23. If not, it proceeds to step S24. More specifically, the process advances to step S23, if the user has selected any of the check boxes in the window 110 of FIG. 11. If not, the process skips to step S24.

(S23) The PDM basic module 20a places a check mark in the check box of the specified file.

(S24) The PDM basic module 20a examines whether the user has pressed the EDIT button 110r. If so, the process advances to step S25. If not, it proceeds to step S26.

(S25) The PDM basic module 20a displays a distribution table editing screen (FIG. 12) on the monitor unit 22, allowing the user to set up the distribution data format.

Figure 12:
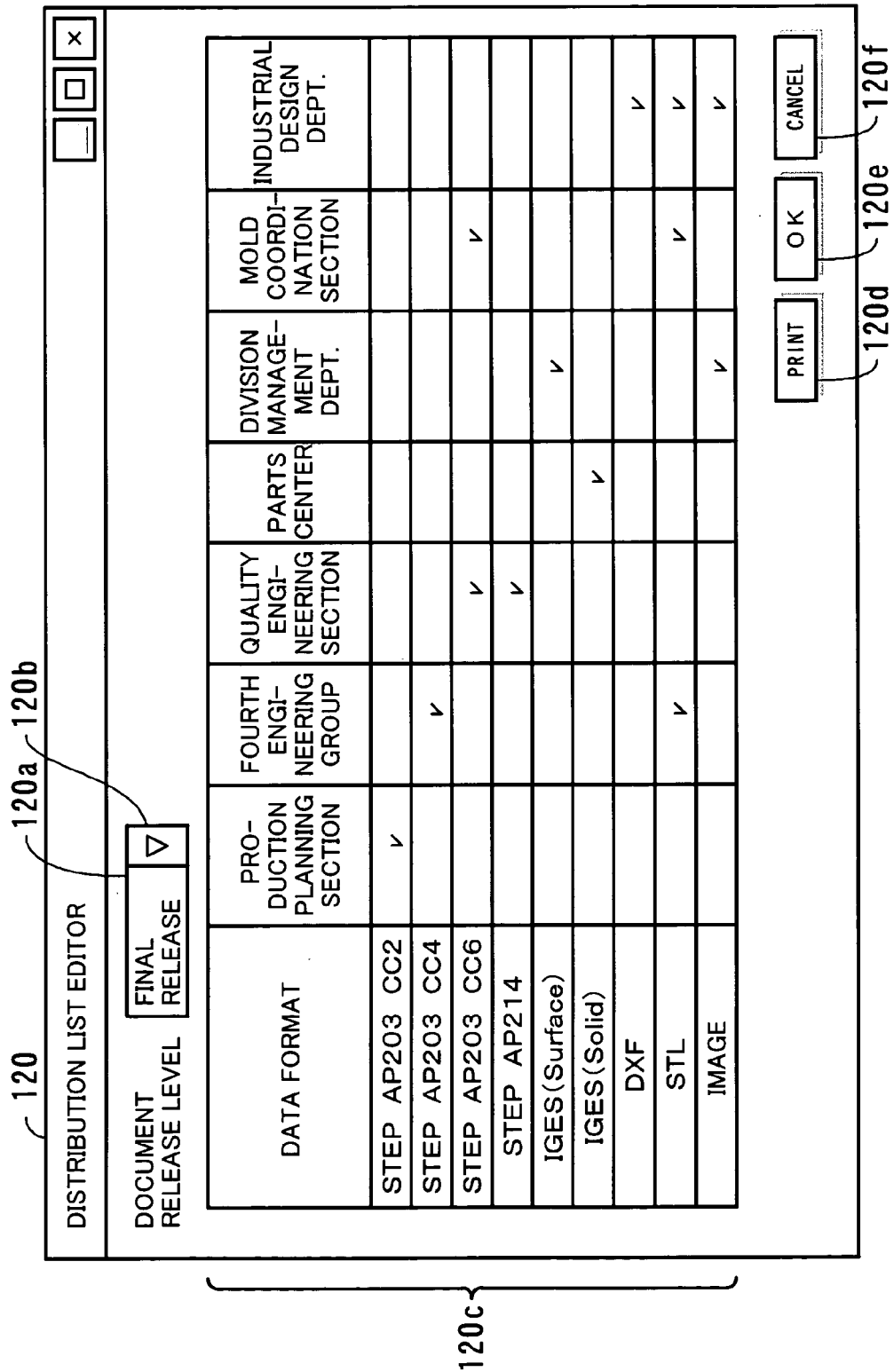
FIG. 12 is a diagram which shows an example of a distribution table editing screen.

The example of FIG. 12 shows a window 120 titled "Distribution Table Editor." At the top portion of this window 120, there is a text box 120a showing the document release level. While it is set to "Final Release" in the present example, the user can fill this field with a different value by selecting an appropriate item from a drop-down list that appears when a drop-down arrow 120b is pressed.

The main section 120c of the window 120 presents another aspect of the distribution table; that is a compatibility matrix showing which data formats are supported in each destination. Take "Production Planning Section" for example. The column assigned to this organizational unit is check-marked only in the first row, which means that the format "STEP AP203 CC2" is the only usable destination data format.

At the bottom of the window 120, three command buttons 120d, 120e, and 120f are seen. The PRINT button 120d initiates a process to print out the displayed information. The OK button 120e is used to save the current setup. The CANCEL button 120f is used to cancel the current data entry.

In the above-described window 120, the user edits the matrix and then presses the OK button 120e, which causes the distribution server 30 to receive and record the updates in the database 30c.

(S26) The PDM basic module 20a examines whether the user has pressed the DATE button 110s shown in FIG. 11. If so, the process advances to step S27. If not, it proceeds to step S28.

Figure 13:
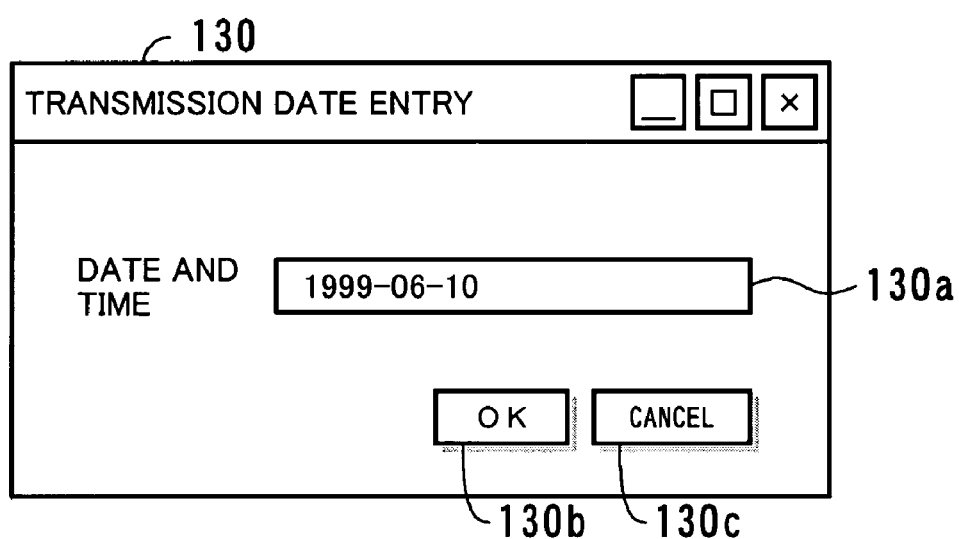
FIG. 13 is a diagram which shows an example of a transmission date entry screen.

(S27) The PDM basic module 20a displays a transmission date entry screen on the monitor unit 22, as illustrated in FIG. 13.

In the example screen of FIG. 13, a window 130 titled "Transmission Date Entry" is provided. This window 70 has a text box 130a for specifying the date (and time) when the system starts to transmit document data files. The user presses an OK button 130b to activate the entered schedule. A CANCEL button 130c is used to cancel the current entry.

(S28) The PDM basic module 20a examines whether the user has pressed the SEND button 110t shown in FIG. 11. If so, the process advances to step S29. If not, it proceeds to step S30.

(S29) The PDM basic module 20a calls a routine that transfers relevant data files to the distribution server 30. The details of this routine will be described later with reference to FIG. 10.

(S30) The PDM basic module 20a determines whether the user has pressed either the CANCEL button 110u or the close button "X" in the upper right corner of the window 110 of FIG. 11. If either button is pressed, the process will be terminated. If not, it returns to step S22 to repeat the same operations.

Figure 10:
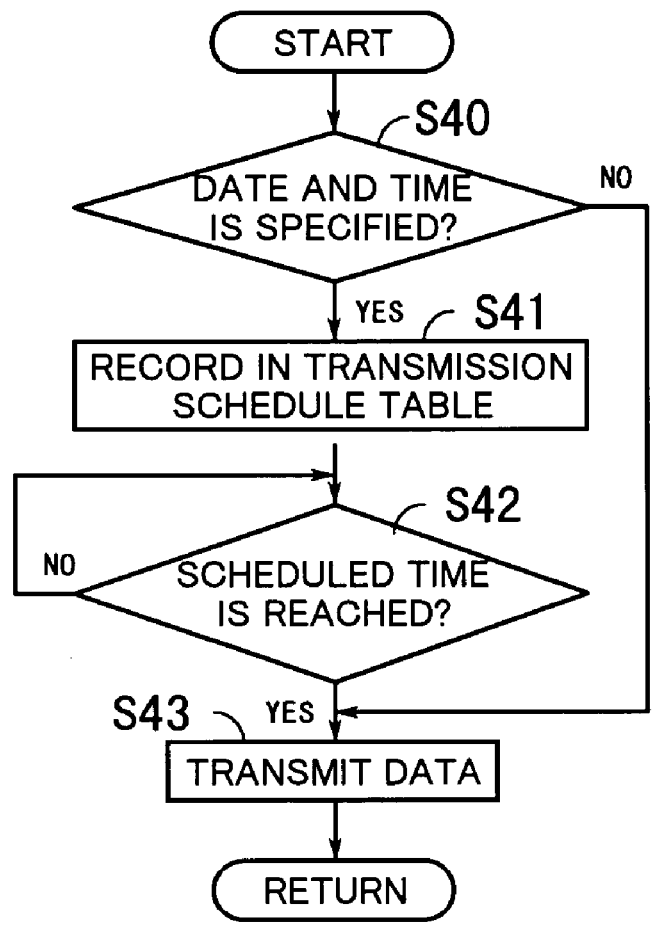
FIG. 10 is a flowchart which explains the details of the data transfer operation shown in FIG. 9.

Referring now to FIG. 10, the aforementioned data transfer routine will be described below. When called at step S29 in the flowchart of FIG. 9, this process executes the following steps.

(S40) The PDM basic module 20a determines whether the user has specified the date and time of data transmission in the screen shown in FIG. 11. If so, the process advances to step S41. If not, it skips to step S43.

(S41) The PDM basic module 20a records the specified transmission date in the transmission schedule table, together with the data file names of the document to be transmitted.

(S42) Comparing the current date and time with the entries in the transmission schedule table, the PDM basic module 20*a* determines whether the scheduled transmission date is reached. If it is reached, the process advances to step S43. If not, it repeats the current step S42.

(S43) The PDM basic module 20*a* retrieves relevant bulk data and metadata files from the database 20*b* and passes them to the distribution server 30. It then exits from this process and returns to the calling process.

Figure 14:
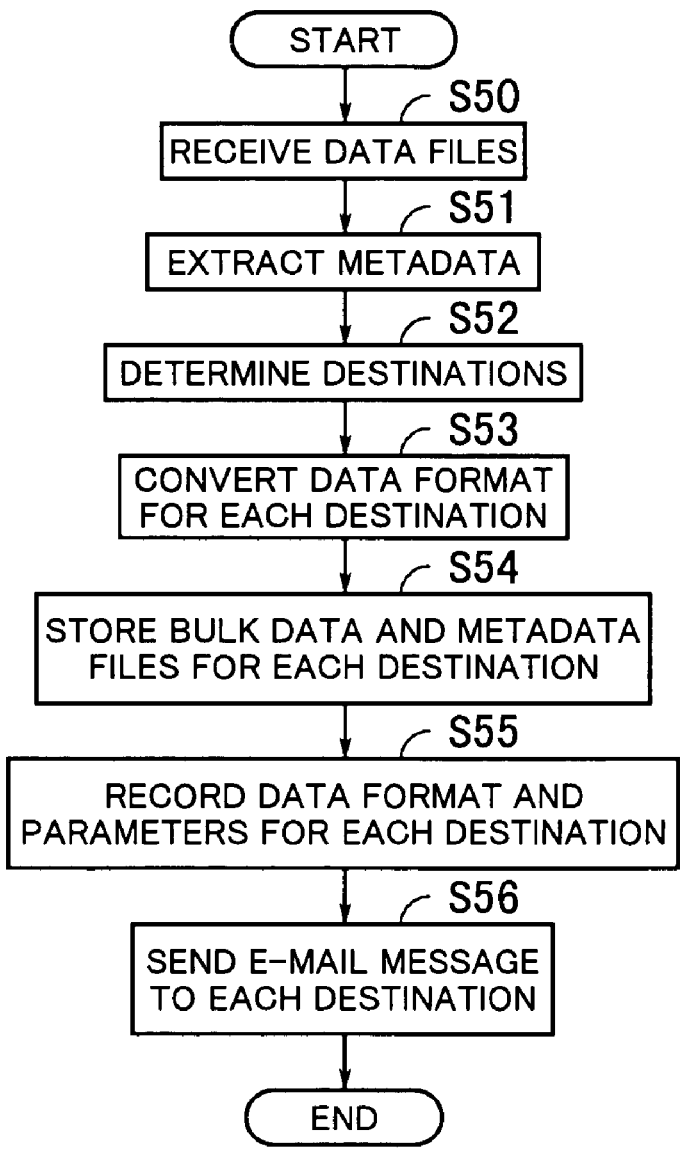
FIG. 14 is a flowchart which shows a process to be executed by a distribution server when it receives some data from a PDM basic unit.

Receiving the above data files from the PDM basic unit 20, the distribution server 30 accepts them and distributes to their destinations. Referring now to FIG. 14, an example of this process will be explained below. The process comprises the following steps.

(S50) The controller 30*b* receives data files from the PDM basic unit 20 through the interface 30*a*.

(S51) The controller 30*b* extracts metadata from the received data files.

(S52) Referring to the extracted metadata, as well as consulting the database 30*c* which stores distribution tables and conditions described earlier in FIGS. 4 and 6, the controller 30*b* determines the destinations of each data file.

Suppose, for example, that the received data file is of a component drawing. It is then evaluated with reference to the distribution condition shown in FIG. 6. If the drawing meets this condition, the system identifies its destinations from the distribution table shown in FIG. 4. They include: Production Planning Section, Fourth Engineering Group, and Mold Coordination Section.

(S53) If necessary, the controller 30*b* converts the data format to meet the requirements of each destination.

More specifically, the controller 30*b* refers to the compatibility matrix defined in the screen of FIG. 12 and converts a given data file into an appropriate format that the intended receiving station can handle. Production Planning Section, for example, can only support the format of "STEP AP203 CC2." The controller 30*b* thus converts the received data to this "STEP AP203 CC2" format, if it is encoded in a different format.

(S54) The controller 30*b* stores the duplicated bulk data and metadata files into the database 30*c* separately for each destination.

In the present example, the database 30*c* has three separate instances of the bulk data and metadata files for the Production Planning Section, Fourth Engineering Group, and Mold Coordination Section.

(S55) For each individual destination, the controller 30*b* records the used data format in the database 30*c*, together with some parameters that are necessary for format adjustment.

The latter parameters would aid the receiving station to reproduce the original drawings from the received data files. That is, if the original drawings cannot be directly reproduced due to some incompatibility problems in geometrical parameters, then the receiving station attempts to recover them by locally adjusting some parameters of the drawings, referring to the original parameters provided by the distribution server 30. Such parameters may include tolerance values of geometry and techniques to represent curved lines (e.g., approximation algorithms and orders).

(S56) The controller 30*b* produces and sends e-mail messages to the individual destinations to indicate the presence of engineering documents that should be delivered to them.

In the present example, the controller 30*b* creates and sends an e-mail message individually to Production Planning Section, Fourth Engineering Group, and Mold Coordination Section.

Now that data files are available in the distribution server 30, the receiving stations 50 then attempt to download them on demand. The following section will first provide a brief description on this subject matter, and then explain it in detail with reference to flowcharts.

Consider here that a remote user sitting at a receiving station 50 has typed in a log-in command through his/her input devices 52. The controller 50*b* in the receiving station then displays a log-in screen of FIG. 15 on the monitor unit 51. This example screen provides a window 140 titled "Log-in" which contains text boxes 140*a* and 140*b* prompting the user to enter his/her log-in name (user name) and password. At the bottom of the window 140, there are an OK button 140*c* and a CANCEL button 140*d*. The OK button 140*c* is used to set up a connection with the distribution server 30. The CANCEL button 140, on the other hand, is used to quit the current log-in session.

Figure 16:
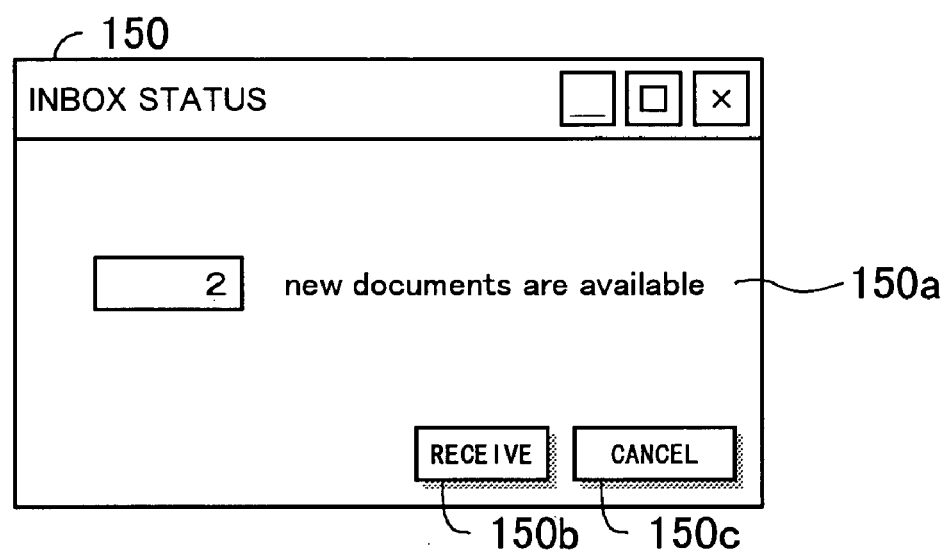
FIG. 16 is a diagram which shows an example of an inbox status screen.

The receiving user now enters his/her name and password in the above-described screen and presses the OK button 140*c*. In response to this, the receiving station 50 attempts to establish a network connection to interact with the distribution server 30. Receiving the log-in request from the receiving station 50, the distribution server 30 invokes a user authentication process to check whether the requesting user has authorized access rights. If the user is successfully authenticated, the distribution server 30 then sends a message to notify the receiving station 50 of how many documents are stored in his/her inbox. This information is displayed on the monitor unit 51 of the receiving station 50 as shown in FIG. 16. That is, the screen provides a window 150 titled "Inbox Status" having a text box 150*a* in its center portion to indicate how many new documents are in the user's inbox. At the bottom of the window 150, there are a RECEIVE button 150*b* and a CANCEL button 150*c*. The RECEIVE button 150*b* is used to initiate a session to download a metadata file from the distribution server 30. The CANCEL button 150*c* allows the user not to download them for the moment.

Suppose that the user presses the RECEIVE button 150*b* in the above-described screen. A reception request is then sent to the distribution server 30. In response to this request, the distribution server 30 retrieves a relevant metadata file from the database 30*c* and sends it out to the receiving station 50. The receiving station 50 displays the received metadata on the monitor unit 51, besides storing it into a predetermined part of the database 50*c*. As FIG. 17 shows, this screen provides a window 160 titled "Document List" which consists of five sections 160*a* to 160*e*.

The top section 160*a* of the window 160 shows the attribute information of the document to be received, including the following data fields. The field titled "Serial No." indicates the serial number that was assigned to the document when it was recorded in the database 20*b*. The fields titled "Requested on" and "Requested by" respectively show when the data distribution was requested and who made the request. The field titled "Checked by/on" consisting of two sets of consecutive sub-fields indicates who checked the document and when they checked it. The next two fields titled "Approved by" and "Approved on" show who approved the document and when he/she approved it.

The second section 160*b* presents a list of product types that are relevant to the document to be received. The user may use a scroll box 160*f* and scroll arrows 160*g* and 160*h* to move through the list in the vertical direction. The third section 160*c* presents a list of components that are relevant to the document to be received. The user may use a scroll box 160*i* and scroll arrows 160*j* and 160*k* to move through the list in the vertical direction. Further, the fourth section 160*d* presents a list of file names that shows which files are available. The user may use a scroll box 1601 and scroll arrows 160*m* and 160*n* to move through the list in the vertical direction. The fifth section 160*e* presents information about a report file that contains descriptions and comments on the document to be received.

At the bottom of the window 160, four command buttons 160*p* to 160*s* are provided. The DOWNLOAD button 160*p* on the far left is used to download to the document. The ACK button 160*q* is pressed when the receiving user acknowledges correct reception of the document. The OUTPUT button 160*r* calls up a process to print out the received drawings. The CANCEL button 160*s* allows the user not to receive the document for the moment.

Suppose here that the user has pressed the DOWNLOAD button 160*p* after looking through the above-described screen to know what kinds of data files are coming. This makes the receiving station 50 send a downloading request to the distribution server 30. Upon receipt of the downloading request, the distribution server 30 retrieves relevant bulk data files from the database 30*c* and sends them to the receiving station 50. The receiving station 50 stores the received bulk data files in an appropriate portion of the database 50*c*. After making sure that all bulk data files have arrived correctly, the receiving user press the ACK button 160*q*, causing an acknowledgment message to be sent back to the distribution server 30. The distribution server 30 forwards this acknowledgment message to the PDM basic unit 20, so that the sending user will be so notified.

Figure 18:
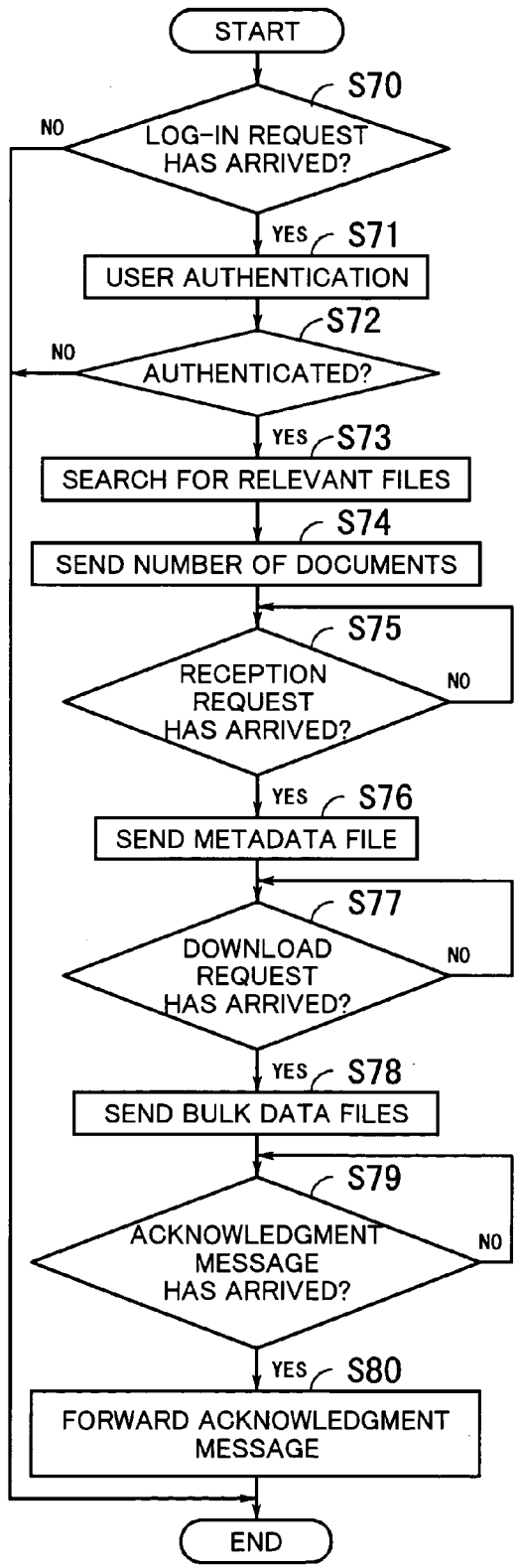
FIG. 18 is a flowchart which shows a process to be executed by a distribution server.

The above process enables the distribution server 30 to transport the stored data files from its database 30*c* to the intended receiving stations. With reference to the flowchart of FIG. 18, the next section will explain the process more specifically. The process shown in FIG. 18 are executed by the distribution server 30 according to the following steps.

(S70) The controller 30*b* determines whether any receiving station is requesting a log-in session. If there is such a log-in request, the process advances to step S71. If not, the process is terminated.

(S71) The controller 30*b* initiates a user authentication process, based on a password and user name sent from the receiving station in question. More specifically, the user enters his/her log-in name (user name) and password in the window 140 of FIG. 15, and the controller 30*b* acknowledges the user's authenticity if the received user name and password are found in its local database 30*c*.

(S72) The controller 30*b* determines whether the authenticity is established. If the requesting user has turned out to be an authorized user, the process advances to step S73. If not, the process is terminated.

(S73) The controller 30*b* searches the database 30*c* for a relevant metadata file, using the user name as a search keyword.

(S74) The controller 30*b* obtains the number of received documents and sends the information to the receiving station that has logged in. This results in an inbox status window 150 (FIG. 16) appearing on the monitor unit of the receiving station.

(S75) The controller 30*b* determines whether there is a reception request from the receiving station. If there is, the process advances to step S76. If not, it repeats the current step S75.

More specifically, the process advances to step S76 when the user presses the RECEIVE button 150*b* in the window 150 of FIG. 16. Although it is not explicitly shown in the flowchart of FIG. 18, the process is interrupted whenever the CANCEL button 150*c* is pressed.

(S76) The controller 30*b* retrieves a relevant metadata file from its database 30*c* and sends the file to the receiving station that has logged in. This results in a document list window 160 (FIG. 17) appearing on the monitor unit of the receiving station.

(S77) The controller 30*b* determines whether a downloading request has arrived from the receiving station. If so, the process advances to step S78. If not, it repeats the current step S77.

More specifically, the process advances to step S78 when the user presses the DOWNLOAD button 160*p* in the window 160 of FIG. 17. Although it is not explicitly shown in this flowchart, the process is interrupted whenever the CANCEL button 160*s* is pressed.

(S78) The controller 30*b* retrieves relevant bulk data files from its database 30*c* and sends them to the requesting station.

(S79) The controller 30*b* determines whether an acknowledgment message has arrived from the receiving station. If so, the process advances to step S80. If not, it repeats the current step S79.

More specifically, the process advances to step S80 when the user presses the ACK button 160*q* in the window 160 of FIG. 17. Although it is not explicitly shown in this flowchart, the process is interrupted whenever the CANCEL button 160*s* is pressed.

(S80) The controller 30*b* forwards the acknowledgment message to the PDM basic unit 20, thus terminating the process.

Figure 19:
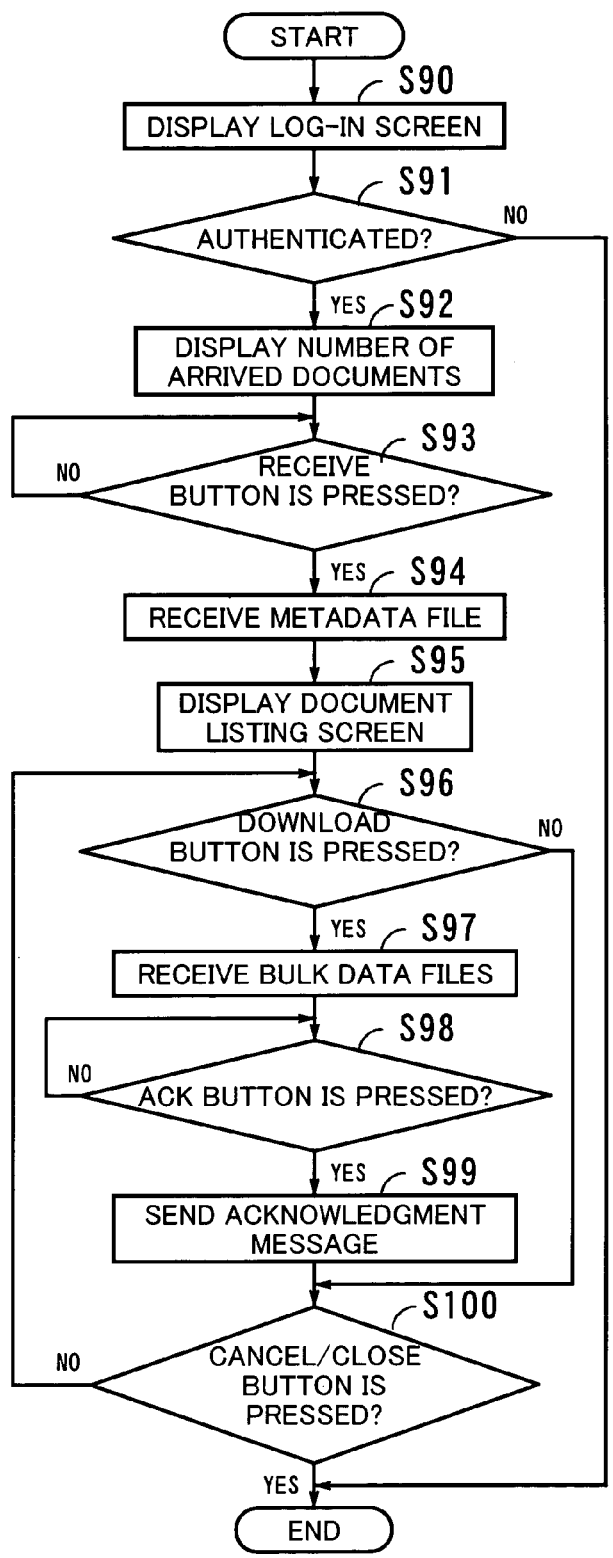
FIG. 19 is a flowchart which shows a process to be executed by a receiving station.

Referring next to the flowchart of FIG. 19, the operation of the receiving station 50 will be described below. The process shown in this flowchart comprises the following steps.

Figure 15:
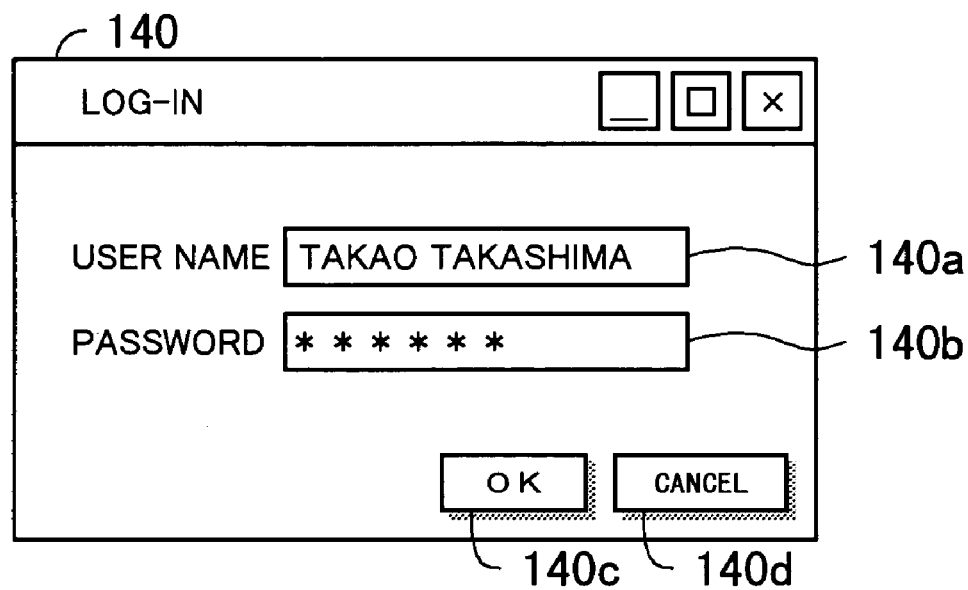
FIG. 15 is a diagram which shows an example of a log-in screen.

(S90) The controller 50*b* displays a log-in screen on the monitor unit 51, as illustrated in FIG. 15.

(S91) The user enters his/her log-on name and password in the log-in screen. The controller 50*b* transmits them to the distribution server 30, and if the authentication is successfully finished, it proceeds to step S92. Otherwise, the process is terminated.

(S92) The controller 50*b* displays the number of arrived documents obtained at step S74 in the flowchart of FIG. 18. That is, an inbox status screen (FIG. 16) appears on the monitor unit 51.

(S93) The controller 50*b* tests whether the user has pressed the RECEIVE button 150*b* in the inbox status screen of FIG. 16. If so, the process advances to step S94. If not, it repeats the current step S93. Although it is not explicitly shown in this flowchart, the process is interrupted whenever the CANCEL button 150*c* is pressed.

(S94) The controller 50*b* receives the metadata file hat is transmitted in step S76 of FIG. 18. The received metadata file is then stored in an appropriate portion of the database 50*c*.

(S95) The controller 50*b* displays a document listing screen on the monitor unit 51, as illustrated in FIG. 17.

(S96) The controller 50*b* tests whether the user has pressed the DOWNLOAD button 160*p* in the document listing screen of FIG. 17. If so, the process advances to step S97. If not, it skips to step S100.

(S97) The controller 50*b* receives the bulk data files that are transmitted at step S78 of FIG. 18. The received bulk data files are then stored in an appropriate portion of the database 50*c*.

(S98) The controller 50*b* tests whether the user has pressed the ACK button 160*q* shown in FIG. 17. If so, the process advances to step S99. If not, it repeats the current step S98. Although it is not explicitly shown in this flowchart, the process is interrupted whenever the CANCEL button 160*s* is pressed.

(S99) The controller 50*b* returns an acknowledgment message to inform the distribution server 30 of the successful reception of the bulk data files.

(S100) The controller 50*b* determines whether the user has pressed either the CANCEL button 160*s* or CLOSE button "X" in the upper right corner of the window 160. If either button is pressed, the process will be terminated. If not, it returns to step S96 to repeat the same operations.

Through the above steps, the distribution server 30 can transport the metadata and bulk data files from its local database 30*c* to the intended receiving stations in a reliable manner.

To summarize the above-described embodiment of the present invention, the PDM basic unit 20 records bulk data (e.g., drawing data) and metadata (i.e., attributes of bulk data), and it supplies them on demand to the distribution server. Since the destinations of those data files are automatically identified by the server, it will not happen that data is delivered to wrong addresses or some necessary destinations are left out.

Further, knowing which data format each receiving station 50 can deal with, the distribution server 30 automatically converts the format of data files supplied from the PDM basic unit 20. This feature liberates the sending user from troublesome tasks of specifying suitable data formats.

Also, the above embodiment is configured to provide a low-volume metadata file in advance of sending bulk data files to the receiving station 50. This allows the receiving user to check the profile of incoming documents, before receiving the main part of the documents. Accordingly, the user can download bulk data files when the network 40 is not in a high traffic condition.

Further, the above embodiment permits the sending user to specify his/her desired date and time of data transmission. The data files in the database 20*b* of the PDM basic unit 20 are not transported to the distribution server 30 until the scheduled time is reached. This means that the sender can previously schedule the distribution of his/her drawings that are still unfinished at the moment. By doing so, he/she can complete and distribute the drawings right on the scheduled day.

Figure 20:
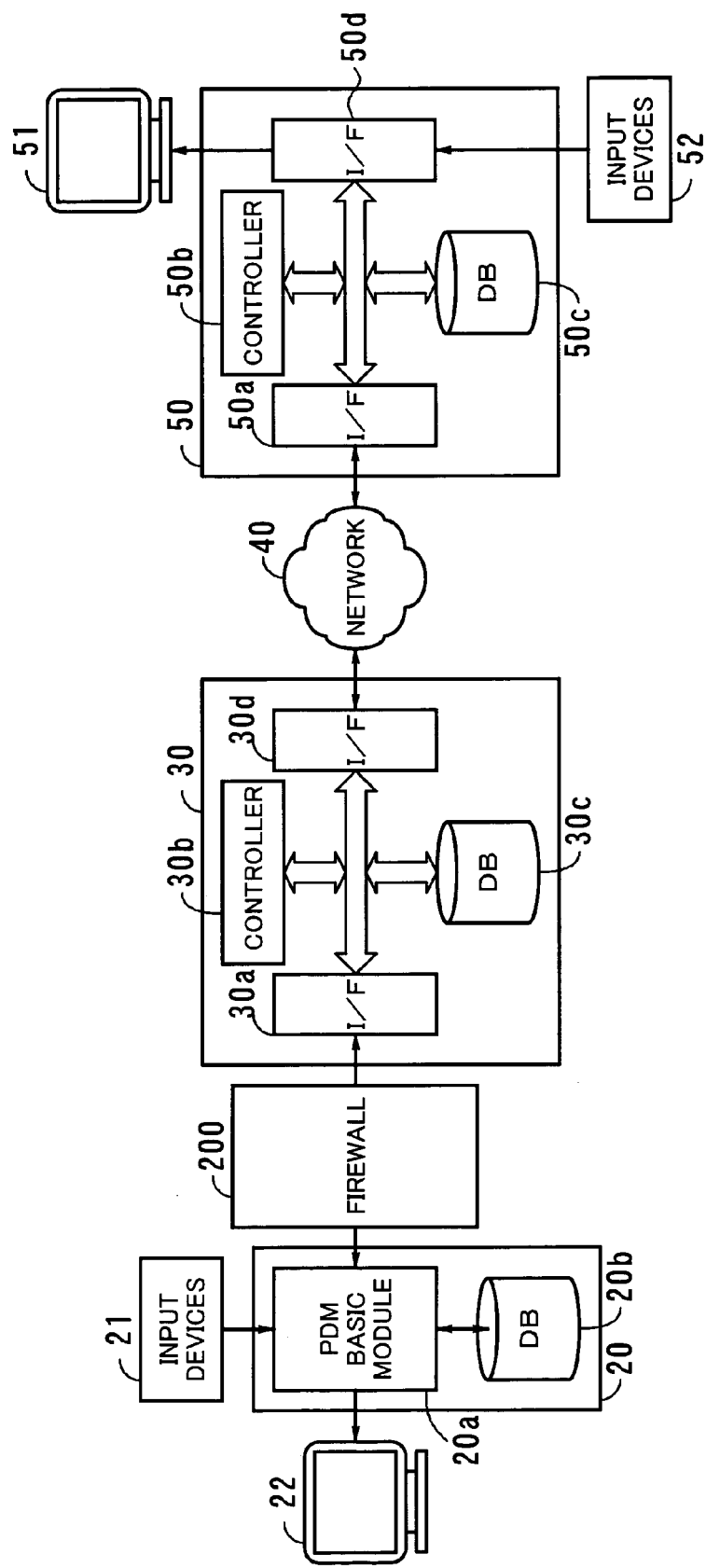
FIG. 20 is a diagram which shows a second embodiment of the present invention.

Referring next to FIG. 20, another embodiment of the present invention will be described below. Since the structure shown in this FIG. 20 is similar to that of the first embodiment shown in FIG. 2, the following explanation will focus on its distinctive elements, while affixing like reference numerals to like elements. Unlike the first embodiment, this second embodiment employs a firewall 200, and the operation of the distribution server 30 is different in part, while other elements and functions are common to those shown in FIG. 2. More specifically, a firewall 200 is interposed between the PDM basic unit 20 and the distribution server 30. This firewall 200 is a protective system, based on a workstation or any other computer platform, which only, passes particular data and protocols to protect a local network from intruders. The distribution server 30 sends drawings to the receiving station 50 after converting them into image data files or plotter data files.

Suppose that, in the embodiment outlined above, the distribution server 30 is now attempting to send data to the distribution server 30 via the firewall 200. The following section will explain how the data is transported, and how the distribution server 30 operates during that session.

The PDM basic unit 20 stores bulk data files and metadata files. Those files are supplied to the distribution server 30 through the firewall 200, when their distribution is requested. While those files may be addressed to a plurality of receiving stations, the PDM basic unit 20 supplies the distribution server 30 with only one instance of each file. The distribution server 30 determines the destinations of the received bulk data files and metadata files, based on a distribution table. The controller 50*b* then converts the bulk data into image data (i.e., bitmap data) or plotter data. It modifies the produced image data or plotter data, embedding some particular parameters related to the distribution task. Such parameters may include the creation date and the name of the person who created it. The modified data files are duplicated and saved into the database 30*c* separately for each determined destination.

Figure 21:
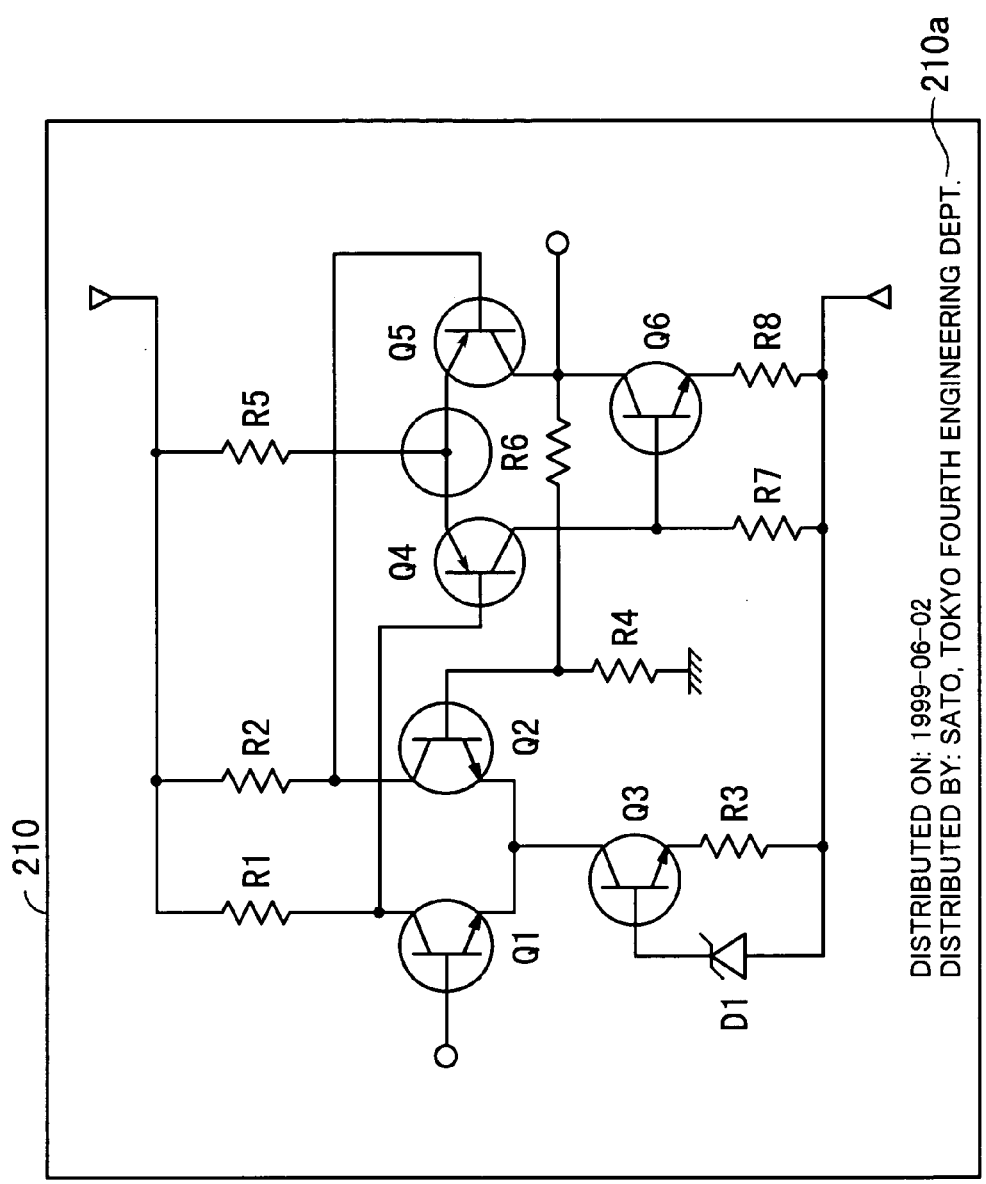
FIG. 21 is an example schematic diagram that is converted into image data.

FIG. 21 shows an example of bulk data stored in the database 30*c* in bitmap form. This example shows a schematic diagram 210 which has an overlaid image 210*a* representing distribution-related information, i.e., the distribution date and distributor's name, at the bottom portion. When the receiving station 50 initiates a log-in session, the controller 30*b* fist performs user authentication, and then sends relevant metadata files and bulk data files subsequently.

It should be noted that, in the above operations, only a single instance of each data file is subjected to the firewall even when a plurality of receiving stations are specified as the destinations. The data files are duplicated by the distribution server so that the plurality of receiving stations can receive them. By minimizing the data traffic through the firewall, which is often regarded as a performance bottleneck, the proposed structure saves the system from slowdown of data transport.

Also, the above embodiment is configured to send drawings to receiving stations after converting them into bitmap image or plotter data. This configuration protects the bulk data from unintended modification at the receiving ends.

Further, the above embodiment is configured to deliver distribution-related information being embedded in the bitmap data or plotter data, in addition to sending a metadata file. This configuration permits the recipient to know the origin of received bulk data files even when their corresponding metadata files was lost.

Figure 22:
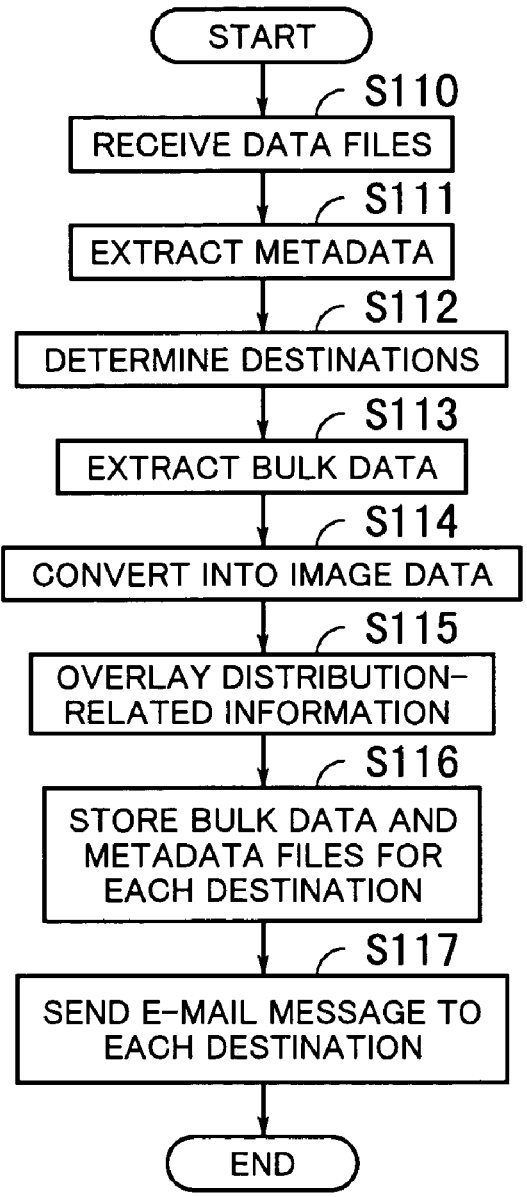
FIG. 22 is a flowchart which shows a process to be executed in the second embodiment shown in FIG. 20.

The above embodiment is implemented as part of the functions of the controller 30*b*. Referring next to the flowchart of FIG. 22, this processing will be described below. The controller 30*b* executes the following steps.

(S110) Via its interface 30a, the controller 30b receives data files that was sent from the PDM basic unit 20 and has passed through the firewall 200.

(S111) The controller 30b extracts metadata from the received data files.

(S112) Referring to the extracted metadata, as well as consulting the distribution tables and distribution conditions described earlier in FIGS. 4 and 6, the controller 30b determines the destinations of each data file.

(S113) The controller 30b extracts bulk data from the received data files.

(S114) The controller 30b converts the obtained bulk data into image data or plotter data.

(S115) The controller 30b overlays distribution-related information (e.g., distribution date and distributor's name) onto the produced image data (or plotter data).

(S116) The controller 30b duplicates the image data files (or plotter data files) having the embedded distribution-related information, as well as relevant metadata files. Those data files are recorded in the database 30c, being sorted by their destinations.

(S117) The controller 30b produces and sends e-mail messages to the individual destinations, indicating the presence of documents that should be delivered to them.

While the above embodiment is configured to send bulk data separately from metadata, it is, of course, possible to send them all together. Further, instead of downloading data files only if so requested by each receiving station, it is also possible to configure the system to automatically download data files and so notify the recipients afterwards.

The proposed processing mechanisms are actually implemented as software functions of a computer system. The process steps that the PDM basic unit, distribution server, and receiving stations execute are encoded in computer programs, which can be stored in a computer-readable storage medium. The computer system executes those programs to provide the intended functions of the present invention. The suitable computer-readable storage media include magnetic storage media and solid state memory devices. Some portable storage media, such as CD-ROMs and floppy disks, are also suitable for circulation purposes. Further, it will be possible to distribute programs through an appropriate server computer deployed on a network. Program files delivered to the users are normally installed in their computer's hard drive or other local mass storage devices, so that they will be executed after being loaded to the computer's main memory.

The above discussion will now be summarized as follows. The present invention provides a data delivery system for delivering data stored in a sending station to at least one receiving station. The sending station advantageously comprises: an attribute identification unit which identifies attributes of data to be distributed; a destination determination unit which determines the destinations of the data according to the attributes identified by the attribute identification unit; a transmitter which sends the data to the destinations determined by the destination determination unit. On the other hand, the receiving station advantageously comprises: a receiver which receives the data sent from the transmitter; and a reproduction unit which restores the received data to its original form. This system delivers created data to all the parties that need it, using its attribute information to identify them. Therefore, the sending user is freed from troublesome and error-prone tasks of data distribution.

Further, the present invention provides a sending station which delivers data stored in its internal or external storage unit to at lease one receiving station. This station advantageously comprises: an attribute identification unit which identifies the attributes of data to be distributed; a destination determination unit which determines the destinations of the data according to the attributes identified by the attribute identification unit; and a transmitter which sends the data to the destinations determined by the destination determination unit. This system enables the sender to distribute data to all the parties that need it in a reliable way.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data delivery system for delivering data stored in a sending station to at least one receiving station, comprising:

distribution tables, disposed in the sending station, each defining parameters regarding where and how to deliver engineering documents of a particular product category, the parameters including destinations of each different type of documents and data formats supported in each of the destinations;

attribute identification means, disposed in the sending station, for identifying attributes of data to be distributed, the attributes including document types;

destination determination means, disposed in the sending station, for determining destinations of the data, according to the document type identified by said attribute identification means, by consulting one of said distribution tables relevant to a specified product category;

transmission means, disposed in the sending station, for sending the data to the destinations determined by said destination determination means;

reception means, disposed in each receiving station, for receiving the data sent from said transmission means;

reproduction means, disposed in each receiving station, for restoring the data received by said reception means to original form thereof;

data conversion means, disposed in the sending station, for converting the data into image data or plotter data;

distribution information embedding means for adding distribution-related information pertaining to the data distribution to the image data or plotter data produced by said data conversion means, and wherein said transmission means sends the data converted by said data conversion means.

2. The data delivery system according to claim 1, further comprising:

format identification means, disposed in the sending station, for identifying which data format each receiving station supports; and format conversion means, disposed in the sending station, for performing data format conversion to make the data compatible with the data format identified by said format identification means.

3. The data delivery system according to claim 1, further comprising parameter storage means, disposed in the sending station, for storing parameters that are necessary for said format conversion means to perform the data format conversion.

4. The data delivery system according to claim 1, further comprising summary data transmission means, disposed in the sending station, for sending summary data that briefly describes the data to be distributed,
  wherein the receiving station requests a particular part of the data as a result of reference to the summary data received from said summary data transmission means, and said transmission means sends the particular part of the data accordingly.

5. The data delivery system according to claim 1, further comprising authentication means, disposed in each receiving station, for verifying authenticity of a receiving user,
  wherein said transmission means sends the data to the receiving station when said authentication means has successfully verified the authenticity of the receiving user.

6. The data delivery system according to claim 1, further comprising date setting means, disposed in the sending station, for specifying a date and time of sending the data,
  wherein said transmission means retrieves and sends the data when the specified date and time is reached.

7. The data delivery system according to claim 1, further comprising:
  a firewall interposed between the sending station and the receiving station; and
  a distribution server interposed between said firewall and the receiving station,
  wherein, in the case that the system delivers the data to a plurality of receiving stations, a single instance of the data is passed from said transmission means to said distribution server through said firewall, and
  wherein said distribution server produces as many copies of the data as required for distribution to the plurality of receiving stations.

8. A sending station which sends data recorded in an internal or external storage unit to at least one receiving station, comprising:
  distribution tables, each defining parameters regarding where and how to deliver engineering documents of a particular product category, the parameters including destinations of each different type of documents and data formats supported in each of the destinations;
  attribute identification means for identifying attributes of data to be distributed, the attributes including document types;
  destination determination means for determining destinations of the data according to the attributes identified by said attribute identification means; and
  transmission means for sending the data to the destinations determined by said destination determination means;
  data conversion means, disposed in the sending station, for converting the data into image data or plotter data;
  distribution information embedding means for adding distribution-related information pertaining to the data distribution to the image data or plotter data produced by said data conversion means, and
  wherein said transmission means sends the data converted by said data conversion means.

9. A computer-readable medium containing a program which delivers data stored in a sending station to at least one receiving station, the computer program being designed to run on a computer in order to cause the computer to execute operations, comprising:
  providing distribution tables, each defining parameters regarding where and how to deliver engineering documents of a particular product category, the parameters including destinations of each different type of documents and data formats supported in each of the destinations;
  identifying attributes of data to be distributed, the attributes including document types;
  determining destinations of the data according to the attributes identified; and
  sending the data to the destinations determined;
  wherein the data is converted into image data or plotter data and distribution-related information pertaining to distribution of the data is added to the image data or plotter data for sending the data.

* * * * *